United States Patent
Rubin et al.

(10) Patent No.: US 9,390,064 B2
(45) Date of Patent: Jul. 12, 2016

(54) MODELING TOOL PASSAGE THROUGH A WELL

(71) Applicant: Halliburton Energy Services, Inc., Houston, TX (US)

(72) Inventors: Heru Rubin, Addison, TX (US); Dominic Anh Tran, Richardson, TX (US); Josiah Wood, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 663 days.

(21) Appl. No.: 13/676,368

(22) Filed: Nov. 14, 2012

(65) Prior Publication Data
US 2013/0124165 A1 May 16, 2013

(30) Foreign Application Priority Data
Nov. 15, 2011 (WO) ................ PCT/US2011/001905

(51) Int. Cl.
G06G 7/48 (2006.01)
G06F 17/10 (2006.01)
E21B 23/00 (2006.01)

(52) U.S. Cl.
CPC ................ *G06F 17/10* (2013.01); *E21B 23/00* (2013.01)

(58) Field of Classification Search
CPC . G06F 17/10; G06F 17/5009; G06F 2217/16; E21B 23/00
USPC .................................................. 703/10; 702/6
See application file for complete search history.

(56) References Cited

U.S. PATENT DOCUMENTS

| 4,169,505 A | 10/1979 | Neal |
| 4,181,186 A | 1/1980 | Blanton |
| 4,695,957 A | 9/1987 | Peltier |
| 5,407,265 A | 4/1995 | Hamidieh et al. |
| 6,112,809 A * | 9/2000 | Angle ........................ E21B 4/18 166/50 |
| 6,443,242 B1 | 9/2002 | Newman et al. |
| 6,516,293 B1 * | 2/2003 | Huang et al. .................... 703/10 |
| 6,618,675 B2 | 9/2003 | Strickland |
| 7,142,985 B2 | 11/2006 | Edwards |
| 7,533,724 B2 | 5/2009 | McLaughlin |
| 8,285,531 B2 | 10/2012 | Moran et al. |
| 2002/0077753 A1 | 6/2002 | Kelly |

(Continued)

FOREIGN PATENT DOCUMENTS

WO    WO 00-12860 A2    3/2000

OTHER PUBLICATIONS

NOV CTES, "Cerberus Drill String Design Solutions" Copyright 2008 (2 pages).

(Continued)

*Primary Examiner* — Eunhee Kim
(74) *Attorney, Agent, or Firm* — Scott Richardson; Fish & Richardson P.C.

(57) ABSTRACT

In modeling passage of an elongate well tool through a well, a computing system receives inputs representing a plurality of geometric characteristics of the well tool including three dimensional surface data characterizing the shape of outwardly facing, lateral surfaces of the well tool. The computing system also receives inputs representing a plurality of geometric characteristics of the well. The computing system determines a prediction of the force to pass the well tool through at least a portion of the well based on a comparison of the three dimensional surface data of the well tool and the plurality of geometric characteristics of the well.

19 Claims, 15 Drawing Sheets

(56) References Cited

U.S. PATENT DOCUMENTS

| | | | |
|---|---|---|---|
| 2003/0216895 | A1 | 11/2003 | Ghaboussi et al. |
| 2006/0173625 | A1 | 8/2006 | Moran |
| 2008/0053705 | A1 | 3/2008 | Aronstam |
| 2008/0262810 | A1 | 10/2008 | Moran et al. |
| 2009/0055135 | A1* | 2/2009 | Tang et al. ............... 703/1 |
| 2009/0114445 | A1* | 5/2009 | Dashevskiy ............ 175/45 |
| 2012/0199400 | A1 | 8/2012 | Boulet et al. |
| 2013/0124165 | A1 | 5/2013 | Rubin et al. |
| 2013/0124166 | A1 | 5/2013 | Clemens et al. |
| 2013/0124176 | A1 | 5/2013 | Fox et al. |

OTHER PUBLICATIONS

NOV CTES, "Cerberus™ for Drilling Software" Copyright 2008 (1 page).
NOV CTES, "Cerberus for Well Intervention™" Copyright 2008 (2 pages).
NOV CTES, "OrionNET™" Copyright 2010 (2 pages).
NOV CTES, "Cerberus for Wireline" Copyright 2010 (2 pages).
NOV CTES, "Cerberus™ for Slickline Fatigue" Copyright 2011 (1 page).
NOV CTES, "Cerberus™ for Jointed Pipe" Copyright 2011 (2 pages).
NOV CTES, "Cerberus for Coiled Tubing™" Copyright 2008 (2 pages).
NOV CTES, "Cerberus™ v10.0 Software Enhancements" (2 pages).
NOV CTES, "Zeta Riser Monitoring and Safety System" Copyright 2010 (2 pages).
NOV CTES, "Cerberus™ Packer and Completion Analysis" Copyright 2011 (1 page).
NOV CTES, "Cerberus™ FEA Engine" Copyright 2011 (1 page).
Halliburton, "RTVS: Real-Time Visualization Services" HCT Technical Software Group, May 2010 (7 pages).
Halliburton, INSITE® for Well Intervention (IWI™) Software, Copyright 2010 (13 pages).
J. Kjaersgaard-Rasmussen et al., "Modelling of Cable Forces as a Decision Support Tool for RLWI Operations" SPE International, SPE 146017, Copyright 2011 (7 pages).
Jeffrey Weiland et al., "Case History Review of the Application of Pressure Transient Testing and Production Logging in Monitoring the Performance of the Mars Deepwater Gulf of Mexico Field" SPE International, SPE 115591, Copyright 2008 (17 pages).
CTES, L.P., "Basic Tubing Forces Model (TFM) Calculation" Oct. 2003 (21 pages).
Authorized officer Kim Woo Chul, International Search Report and Written Opinion in PCT/US2011/001905; mailed Aug. 3, 2012, 16 pages.
John A. Quirein, "Apparatus and Methods of Analysis of Pipe and Annulus in a Wellbore" Application No. PCT/US11/41840, Filed Jun. 24, 2011, 58 pages.
Authorized Officer Simin Baharlou, International Preliminary Report on Patentability, PCT/US2011/001905, mailed May 30, 2014, 9 pages.
"Cerberus for Well Intervention", National Oilwell Varco, copyright 2015, 4 pages.
"Cerberus for Coiled Tubing", National Oilwell Varco, copyright 2015, 2 pages.
"Cerberus for Wireline", National Oilwell Varco, copyright 2015, 2 pages.

* cited by examiner

MODELING TOOL PASSAGE THROUGH A WELL

TECHNICAL BACKGROUND

This disclosure relates to modeling passage of a tool through a well.

BACKGROUND

Although wells are formed with dimensions to allow passage of tools from the surface, the inexact nature of wellbore formation and completion may, in fact, block or hinder passage of tools. Predicting whether and/or how particular geometries of well tools and the well tool string (e.g., diameters of particular components, lengths of particular components, and otherwise) may interact with the well (or other downhole tubular structure, such as a casing or liner) while under real-world operational conditions may allow well site operators to make decisions regarding, for instance, tool string component selection and arrangement, well design, and other factors (e.g., feasibility of cable mechanics, drum crush potential, tractoring requirements) in drilling and production operations.

DETAILED DESCRIPTION

Figure 1:
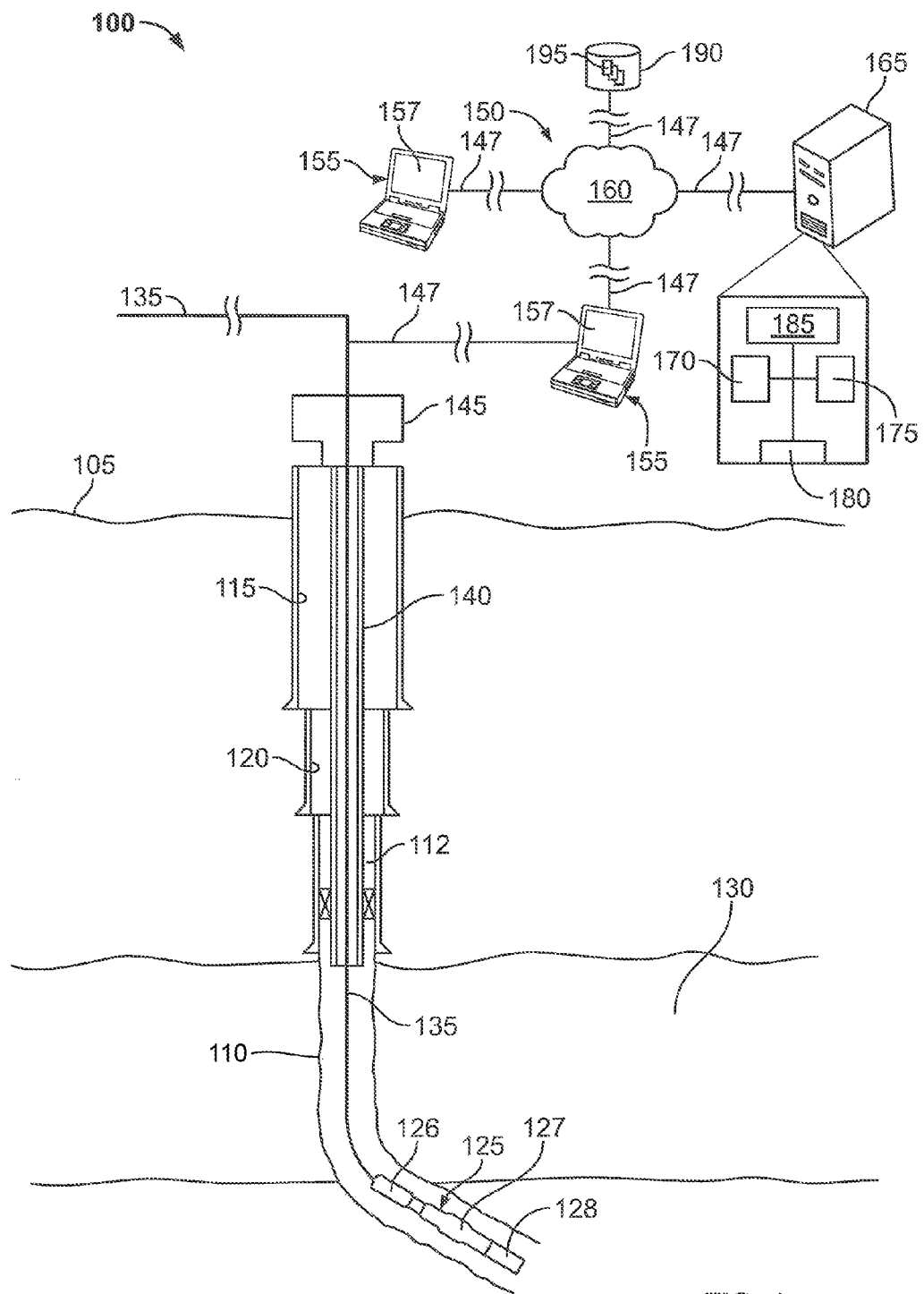
FIG. 1 is a schematic of an example well in side cross-section, a well tool string, and a distributed computing system that includes a modeling system operable to model interactions between the well tool string and the well.

FIG. 1 illustrates an example embodiment of well 100 with a well tool string 125 passing through the well 100. Components of the well 100 and the tool string 125 are communicably coupled with a distributed computing system 150 that includes a modeling system 185 operable to model interactions between the well tool string 125 and the well 100, for example, passage of the tool string 125 through the well 100.

The illustrated well 100 includes the wellbore 110 extending to and/or through one or more subterranean zones, such as the illustrated subterranean zone 130, from a terranean surface 105. Although illustrated as extending from the terranean surface 105, the wellbore 110 may be formed from the Earth's surface at a location under a body of water rather than the terranean surface 105. In other words, in some embodiments, the terranean surface 105 may be an ocean, gulf, sea, or any other body of water. In short, reference to the terranean surface 105 includes both land and water surfaces and contemplates forming and/or developing one or more wellbores from either or both locations.

One or more strings of casing may be set in place in the wellbore 110. For example, the illustrated well system 100 includes a conductor casing 115, which extends from the terranean surface 105 shortly into the Earth. A portion of the wellbore 110 enclosed by the conductor casing 115 may be a large diameter borehole. Downhole of the conductor casing 115 may be additional lengths of casing 120. The casing 120 may enclose a slightly smaller borehole and protect the wellbore 110 from intrusion of, for example, freshwater aquifers located near the terranean surface 105, and/or isolate hydrocarbon production from specific layers.

The illustrated wellbore 110 includes a substantially vertical portion and a directional portion. The vertical portion of the wellbore 110 may extend generally vertically downward toward a kickoff point and then turn at an angle towards the directional (e.g., radiussed, slant, horizontal) portion of the wellbore 110.

Although illustrated as a substantially vertical wellbore with a directional portion extending from the vertical portion, the present disclosure contemplates that vertical, directional, horizontal, slant, articulated, radiussed, and other types of wellbores may be included and/or formed within the well system 100.

Although at least a portion of the wellbore 110 is illustrated as a substantially vertical wellbore, even vertical wellbores (cased or open hole) may include slight turns (e.g., cork-screwing), crevices, shoulders, divots, and other inconsistencies in the formation of the wellbores. Such inconsistencies may be contact, catch, or hang-up points/surfaces that a well tool string, such as the well tool string 125 may come into contact with, interfere with, and hang-up on during tips into and out of the wellbore 110.

Continuing with FIG. 1, as illustrated, the wellbore 110 extends into and through a subterranean formation 130. The illustrated subterranean formation 130 is a hydrocarbon bearing formation, such as, for example, shale, sandstone, coal, or other geologic formation that contains oil, gas, or other hydrocarbons, but could be other types of formations. Once the wellbore 110 is formed, the basic physics underlying production involves a migration of fluids (liquids and/or gas) through permeable rock formations such as the subterranean formation 130 to areas of lower pressure created by the wellbore 110. These fluids may then flow through a casing of the wellbore 110 or an open hole completion and are eventually brought to the surface.

Extending above the terranean surface 105, as illustrated, is a wellhead 145. The wellhead 145 can contain or be coupled to a broad array of components, including sensors (e.g., temperature, pressure, flow and other sensors), valves, blow-out preventers, snubbing heads, and other components. The wellhead 145 may support a tubular, such as a production tubing string 140 extending through the annulus 112 of the wellbore 110. In some embodiments, the tubing string 140 may receive the well tool string 125 as it is run into the well 100. Here, the well tool string 125 is depicted as being conveyed on a line 135, but in other instances the tool string 125 may incorporate additional tubing, including jointed or coiled tubing, for conveying the tools thereof into and out of the well 100. The line 135 may be any type line for conveying the tool string 125 into and out of the well 100, including wireline, slickline, electric (e-line), and other. In the present example, the line 135 is an electric line (e-line) that facilitates a supply of electric power, control, and data between the terranean surface 105 (e.g., from computing system 150 or other control system or controller) and the well tool string 125. Typically, the electric line 135 may be connected by a drum and spooled off of a wireline truck to a wireline sheave (not shown). In certain instances, conveyance of the tool string 125 through the well can be assisted, for example, by well tractor, autonomous well robot, by being pumped, and or in another manner.

The electric line 135 is coupled to the well tool string 125, which comprises well tools 126, 127, and 128. Although three well tools are illustrated as part of the well tool string 125, there may be more, or fewer, well tools as part of the well tool string 125 depending on, for instance, the type of operation performed by the well tool string 125. Some example well tools include, for example, sensors (e.g., temperature, pressure, MWD, LWD, and others), rope sockets, accelerators, detent jars, stems, spang jars, and/or other tools.

The sensors in the well tool string 125 and/or wellhead 145 and any other sensors of the well 100 are coupled to the computing system 150 through one or more communication links 147. Generally, the communication links 147 may be any wired or wireless communication protocol and equipment operable to transfer data (e.g., measured information, instructions, and other data), either in real-time (e.g., without intentional delay, given the processing limitations of the system and the time required to accurately measure data), near real-time (e.g., at or near real-time and accounting for some processing time but with no human-appreciable delays that are due to computer processing limitations), or at a delayed time (e.g., accounting for human user interaction). For example, in some embodiments, the communication links 147 may facilitate transfer of data between the computing system 150 (or other computing system or controller communicably coupled to the computing system 150) and the well tool string 125, wellhead 145 and/or other sensors of the well 100 during the operations (e.g., MWD, LWD, or slickline operations). Alternatively, data may be transferred before or after completion of such operations, such as, for example, after the well tool string 125 has been removed to the terranean surface 105. In any event, the present disclosure contemplates that data is transferred within an appropriate time frame commensurate with the operations being performed with well system 100.

The illustrated computing system 150 includes a number of clients 155, a server system 165, and a repository 190 communicably coupled through a network 160 by one or more communication links 147 (e.g., wireless, wired, or a combination thereof). The computing system 150, generally, executes applications and analyzes data during, before, and after one or more operations (e.g., drilling, completion, workover, and otherwise) performed by well system 100. For instance, the computing system 150 may execute the modeling system 185 to model passage of the well tool string 125 through the wellbore 110 and other tubulars, such as the tubing 140.

In general, the server system 165 is any server that stores one or more hosted applications, such as, for example, the modeling system 185. In some instance, the modeling system 185 may be executed via requests and responses sent to users or clients within and communicably coupled to the illustrated computing system 150 of FIG. 1. In some instances, the server system 165 may store a plurality of various hosted applications, while in other instances, the server system 165 may be a dedicated server meant to store and execute only a single hosted application, such as the modeling system 185.

In some instances, the server system 165 may comprise a web server, where the hosted applications represent one or more web-based applications accessed and executed via network 160 by the clients 155 of the system to perform the programmed tasks or operations of the hosted application. At a high level, the server system 165 comprises an electronic computing device operable to receive, transmit, process, store, or manage data and information associated with the computing system 150. Specifically, the server system 165 illustrated in FIG. 1 is responsible for receiving application requests from one or more client applications associated with the clients 155 of computing system 150 and responding to the received requests by processing said requests in the associated hosted application, and sending the appropriate response from the hosted application back to the requesting client application.

In addition to requests from the external clients 155 illustrated in FIG. 1, requests associated with the hosted applications may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server system 165, computing system 150 can be implemented using two or more server systems 165, as well as computers other than servers, including a server pool. Indeed, server system 165 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server system 165 may be adapted to execute any operating system, including Linux, UNIX, Windows, Mac OS, or any other suitable operating system.

In the illustrated embodiment, and as shown in FIG. 1, the server system 165 includes a processor 170, an interface 180, a memory 175, and the modeling system 185. The interface 180 is used by the server system 165 for communicating with other systems in a client-server or other distributed environment (including within computing system 150) connected to the network 160 (e.g., clients 155, as well as other systems communicably coupled to the network 160). Generally, the interface 180 comprises logic encoded in software and/or hardware in a suitable combination and operable to communicate with the network 160. More specifically, the interface 180 may comprise software supporting one or more communication protocols associated with communications such that the network 160 or interface's hardware is operable to communicate physical signals within and outside of the illustrated computing system 150.

Generally, the network 160 facilitates wireless or wireline communications through the communication links 147 between the components of the computing system 150 (e.g., between the server system 165 and the clients 155), as well as with any other local or remote computer, such as additional clients, servers, or other devices communicably coupled to network 160 but not illustrated in FIG. 1. The network 160 is illustrated as a single network in FIG. 1, but may be a continuous or discontinuous network without departing from the scope of this disclosure, so long as at least a portion of the network 160 may facilitate communications between senders and recipients. The network 160 may be all or a portion of an enterprise or secured network, while in another instance at least a portion of the network 160 may represent a connection to the Internet. In some instances, a portion of the network 160 may be a virtual private network (VPN), such as, for example, the connection between the clients 155 and the server system 165. Further, all or a portion of the network 160 can comprise either a wireline or wireless link. Example wireless links may include 802.11a/b/g/n, 802.20, WiMax, and/or any other appropriate wireless link. In other words, the network 160 encompasses any internal or external network, networks, sub-network, or combination thereof operable to facilitate communications between various computing components inside and outside the illustrated computing system 150. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server system 165 includes a processor 170. Although illustrated as a single processor 170 in FIG. 1, two or more processors may be used according to particular needs, desires, or particular embodiments of computing system 150. Each processor 170 may be a central processing unit (CPU), a blade, an application specific integrated circuit (ASIC), a field-programmable gate array (FPGA), or another suitable component. Generally, the processor 170 executes instructions and manipulates data to perform the operations of server system 165 and, specifically, the modeling system 185. Specifically, the server's processor 170 executes the functionality required to receive and respond to requests from the clients 155 and their respective client applications, as well as the functionality required to perform the other operations of the modeling system 185.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, C#, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated computing system 150, processor 170 executes one or more hosted applications on the server system 165.

At a high level, the modeling system 185 is any application, program, module, process, or other software that may execute, change, delete, generate, or otherwise manage information according to the present disclosure, particularly in response to and in connection with one or more requests received from the illustrated clients 155 and their associated client applications. In certain cases, only one modeling system 185 may be located at a particular server system 165. In others, a plurality of related and/or unrelated modeling systems may be stored at a single server system 165, or located across a plurality of other server systems 165, as well. In certain cases, computing system 150 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications may represent web-based applications accessed and executed by remote clients 155 or client applications via the network 160 (e.g., through the Internet).

Further, while illustrated as internal to server system 165, one or more processes associated with modeling system 185 may be stored, referenced, or executed remotely. For example, a portion of the modeling system 185 may be a web service associated with the application that is remotely called, while another portion of the modeling system 185 may be an interface object or agent bundled for processing at a remote clients 155. Moreover, any or all of the modeling system 185 may be a child or sub-module of another software module or enterprise application (not illustrated) without departing from the scope of this disclosure. Still further, portions of the modeling system 185 may be executed by a user working directly at server system 165, as well as remotely at clients 155.

The server system 165 also includes memory 175. Memory 175 may include any memory or database module and may take the form of volatile or non-volatile memory including, without limitation, magnetic media, optical media, random access memory (RAM), read-only memory (ROM), removable media, or any other suitable local or remote memory component. Memory 175 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server system 165 and its one or more hosted applications. Additionally, memory 175 may include any other appropriate data, such as VPN applications, firmware logs and policies, firewall policies, a security or access log, print or other reporting files, as well as others.

The illustrated computing system 150 of FIG. 1 also includes one or more clients 155. Each client 155 may be any computing device operable to connect to or communicate with at least the server system 165 and/or via the network 160 using a wireline or wireless connection. Generally, each client 155 includes a processor, an interface, a memory, as those components are described above, as well as a client application and a graphical user interface (GUI) 157. In general, each client 155 comprises an electronic computer device operable to receive, transmit, process, and store any appropriate data associated with the computing system 150 of FIG. 1. It will be understood that there may be any number of clients 155 associated with, or external to, computing system 150. For example, while illustrated computing system 150 includes two clients 155, alternative implementations of computing system 150 may include a single client 155 communicably coupled to the server system 165, or any other number suitable to the purposes of the computing system 150. Additionally, there may also be one or more additional clients 155 external to the illustrated portion of computing system 150 that are capable of interacting with the computing system 150 via the network 160. Further, the term "client" and "user" may be used interchangeably as appropriate without departing from the scope of this disclosure. Moreover, while each client 155 is described in terms of being used by a single user, this disclosure contemplates that many users may use one computer, or that one user may use multiple computers.

As used in this disclosure, client 155 is intended to encompass a personal computer, touch screen terminal, workstation, network computer, kiosk, wireless data port, smart phone, personal data assistant (PDA), one or more processors within these or other devices, or any other suitable processing device. For example, each client 155 may comprise a computer that includes an input device, such as a keypad, touch screen, mouse, or other device that can accept user information, and an output device that conveys information associated with the operation of the server system 165 (and the modeling system 185) or the client 155 itself, including digital data, visual information, the client application, or the GUI 157. Both the input and output device may include fixed or removable storage media such as a magnetic storage media, CD-ROM, or other suitable media to both receive input from and provide output to users of the clients 155 through the display, namely, the GUI 157.

In some instances, a particular client 155 is specifically associated with an administrator of the illustrated computing system 150. The administrator can modify various settings associated with one or more of the other clients 155, the server system 165, the modeling system 185, and/or any relevant portion of computing system 150. For example, the administrator may be able to modify the relevant default values associated with the modeling system 185.

Each of the illustrated clients 155 includes a GUI 157 comprising a graphical user interface operable to interface with at least a portion of computing system 150 for any suitable purpose, including generating a visual representation of the client application (in some instances, the client's web browser) and the interactions with the hosted application, including the responses received from the hosted application received in response to the requests sent by the client application. Generally, through the GUI 157, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 157 can represent any graphical user interface, including but not limited to, a web browser, touch screen, or command line interface (CLI) that processes information in computing system 150 and efficiently presents the information results to the user.

In general, the GUI 157 may include a plurality of user interface (UI) elements, some or all associated with the client application and/or the modeling system 185, such as interactive fields, pull-down lists, and buttons operable by the user at clients 155. These and other UI elements may be related to or represent the functions of the client application, as well as other software applications executing at the clients 155. In particular, the GUI 157 may be used to present the client-based perspective of the modeling system 185, and may be used (as a web browser or using the client application as a web browser) to view and navigate the hosted application, as well as various web pages located both internal and external to the server, some of which may be associated with the hosted application.

The illustrated repository 190 may be any database or data store operable to store data 195 associated with the well system 100. Generally, the data 195 may comprise inputs to the modeling system 185, historical information of the well system 100 or other well systems, and output data from the modeling system 185. For instance, the data 195 may include inputs 240, 245, 250, as well as data from a solid model store 225, a tool/well/fluids specifications store 230, or a history store 235 as shown and described with reference to FIG. 2. The data 195 may also include outputs 255, 260, and/or 270 shown and described with reference to FIG. 2.

Figure 2:
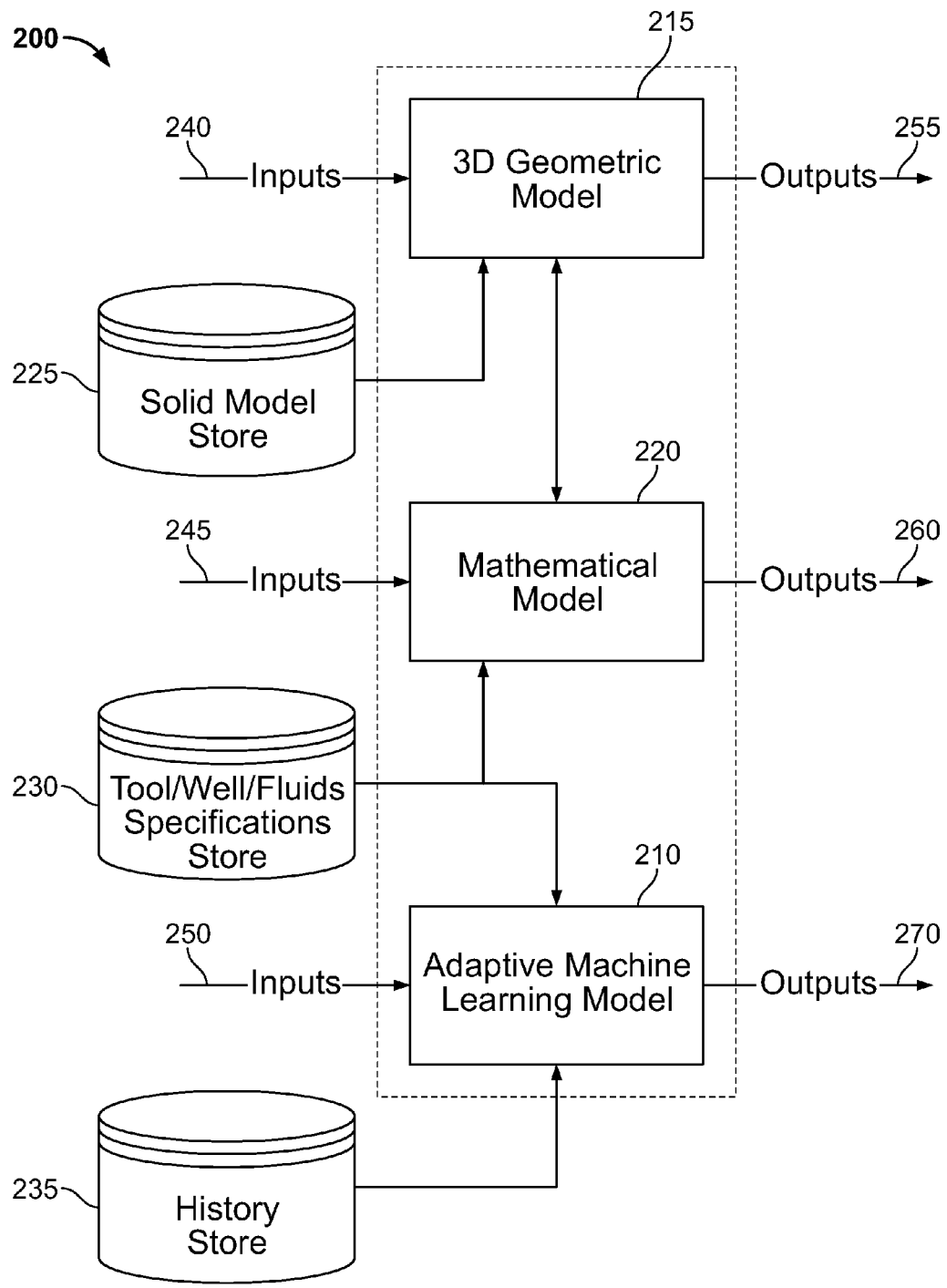
FIG. 2 is a functional diagram of a modeling system configured to operate on a computing system.

FIG. 2 depicts an example tool passage modeling system 200 that can be used as modeling system 185. The modeling system 200 has a number of different modules—a 3D geometric model 215, a mathematical model 220 and an adaptive machine learning model 210. Each of the modules will be described in more detail below. The modules can be operated separately or operated together, in series and/or parallel or otherwise, to provide information about passage through and/or operation of well tools in the well. For example, in certain instances, two or more of the modules can be operated in evaluating the same scenario to provide a greater degree of confidence, and presumably accuracy, than operation of a single module. In another example, two modules can be operated in evaluating the same scenario, and the third operated as a tie breaker only if the outcomes predicted by the first two modules operated conflict.

In certain instances, the modeling system 185 can be operated in the well design phase to evaluate multiple possible well configurations in connection with multiple possible tool string configurations and conveyances (e.g., line, coiled tubing, or jointed tubing and whether a tractor will be used, whether conveyance will be assisted by pumping fluid, and other). In certain instances, the modeling system 185 can be operated using conditions of an existing well in the tool string design phase to iteratively evaluate multiple possible tool sting configurations and conveyances. From the multiple possible tool string configurations and conveyances and multiple possible well configurations, if done during the well design phase, the operator can select the combination that will allow the tool string to pass the well to/from a specified depth, that requires the least or below a specified amount of force to pass to/from the specified depth, and/or that will provide the greatest or above a specified amount of force in operating, for example, in a jarring operation. In instances where the modeling system 185 is operated concurrently with the tool string being passed through the interval of the well, the operator may use information from the modeling system 185 to test and select well and/or tool string conditions, such as fluid flow rates, pressures, orientation of the tool string and/or other conditions, and then adjust the conditions dynamically—as the tubing string is being passed through the interval of the well—to improve, over the current conditions, the likelihood of the tool sting passing through the interval, decrease the forces necessary to pass the tool string through the interval, and/or improve the effectiveness of the tool string's operation, for example, in jarring operations.

The mathematical model 220 uses a simplified approximation of the tool string geometry and a simplified approximation of well geometry to determine whether the tool string can pass through an interval of the well. In certain instances, the mathematical model 220 can further determine the forces acting on the tool string, and tools thereof, at various locations along the interval, and how much force is needed to be applied to the tool string to pass the tool string downhole through the well interval and/or uphole through the interval. In certain instances, the mathematical model 220 can use the force information in evaluating operation of the tool string and tools thereof. The interval can be a portion of the well or the entire well. For example, in certain instances, the interval spans from the top of the well, at a wellhead, to some specified depth to which it is expected that the tool string will be run. Some example models that can be used in providing the features of mathematical model 220 include InSite For Well Intervention, where InSite is a registered trademark of Halliburton Energy Services, Inc., and Cerberus, a registered trademark of National Oil Well Varco and the underlying calculations of which are described in more detail in Basic Tubing Forces Model (TFM) Calculation, Tech Note CTES, L.P., 2003. These example models can be classified as 2D in nature.

The mathematical model 220 receives a number of inputs 245 from which it determines whether the tool string can pass the interval and the forces involved. The inputs 245 can be user input and/or can come from other systems communicably coupled to the mathematical model 220. The inputs 245 include tubing string characteristics, well characteristics, fluid characteristics and other characteristics. In certain instances, the mathematical model 220 can be operated concurrently with the real-world operations it is modeling and provide information on passage of the tool string and the forces involved at approximately the same time, accounting for time taken to perform the computing, that the modeled tool passage and/or forces are happening in the real-world. For example, the model 220 may be operated to model the real-world in real time. Certain of the inputs 245, for example those that may vary with time, can be provided to the mathematical model 220 without substantial or intentional delay, for example, in real time.

The tubing string characteristics include information about the tools and other components of the tool string. Some examples can include geometric characteristics such as the maximum outside and inside diameters of the tools and other components of the tool string, the lengths of the tools and other components of the tool string, the types of tools and other components arranged in the tool string, what order the tools and other components are arranged in the tool string, the type of connection between the tools and other components of the tool string, tool and component weights, whether the tool string is comprised entirely of tubing and tools or whether the string is of the type deployed on line (e.g., wireline, slickline, e-line or other) and, if on line, the characteristics of the line such as the weight and diameter of the line, and other information. The tool string characteristics can also include material properties such as the types of material of the tools and components of the tool string and line (if provided), the yield and plastic strength and elastic modulus of the materials, the frictional characteristics of the materials and other information. The tool string characteristics can also include dynamic properties such as applied torque and forces, rotational and axial movement speeds and other information.

Figure 3A:
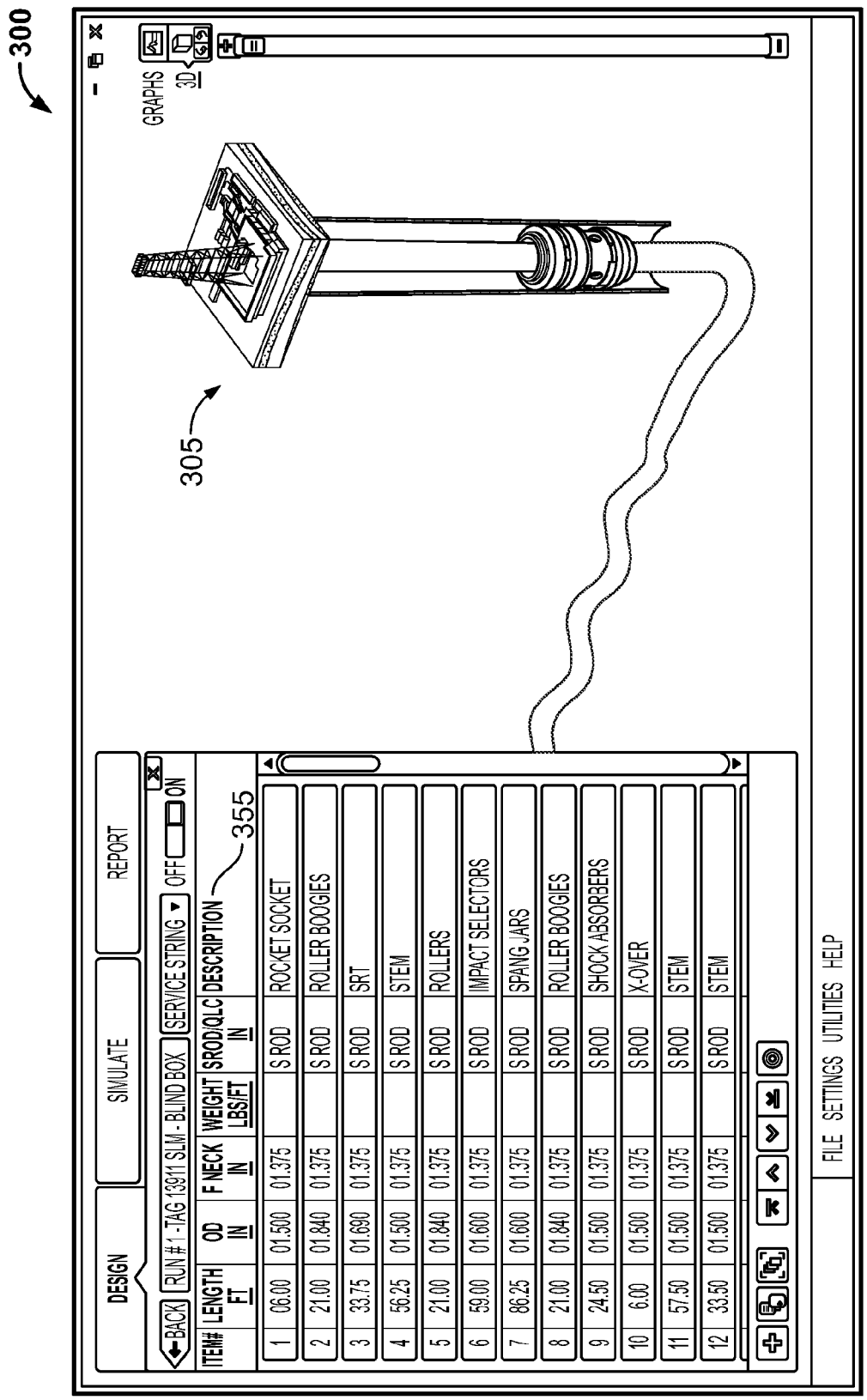
FIGS. 3A-3B illustrate example graphical user interfaces of a 3D modeling system.

The tool string characteristics can also include particular information about the tools that make up the tool string. For example, the tool string characteristics can include information about whether the tool has rollers and how and where they reduce the frictional coefficients of the system, centralizers, knuckle joints and how and where they reduce the stiffness of the tool string, packers, nozzles or other flow restrictions, and/or other tool string characteristics. In certain instances, the tubing string characteristics can include additional or different information than geometric, material, dynamic and tool specific characteristics. In FIG. 2, the mathematical model 220 is coupled to a data store 230 that includes a database of tools or other components that could be used in the tool string, for example identified by manufacturer, model number, size and pressure rating, correlated to their characteristics. The data store 230 may be coupled to a GUI that allows the operator to select the tools and other components of the tool string being analyzed from a list and/or by manually inputting the identifier. Thereafter, the tools string characteristics are populated to the mathematical model 220 from the data store 230 based on the user's input. FIG. 3A shows a GUI 300 for facilitating an operator's access to the information in data store 230, and includes pull down menus with lists of particular tubing string components and produces a computer-generated real-world looking image 305 of the tool string and well.

The well characteristics include information about the wellbore and the components, such as casing and completion string components, installed in the wellbore that make up the well. Some examples can include geometric characteristics of the wellbore, such as the diameter of the wellbore at different positions along the length of the well, the trajectory of the wellbore at different positions along the length of the well, the eccentricity of the wellbore at different positions along the length of the well, surface roughness in open hole portions of the well, and other information. In certain instances, the geometric characteristics of the wellbore can be obtained from survey data, such as survey logs (having information on inclination relative to gravity and direction per depth), caliper logs (diameter per depth) and other data, and imported into the mathematical model 220. The geometric characteristics of the components installed in the wellbore can include the outside and inside diameters of the components at different positions along the length of the well, the lengths of the components, the types of components, their order in the well, the type of connection or other interface between the components, flow restrictions through the components, component weights, and other information. The well characteristics can also include material properties such as the types of material of the well components, the yield and plastic strength and elastic modulus of the materials, the frictional characteristics of the materials and other information. In certain instances, the well characteristics can include additional information beyond geometric and material characteristics.

In FIG. 2, the data store 230 can also be used and populated with a database of well components, for example identified by manufacturer, model number, size and pressure rating, correlated to their characteristics. As above, the data store 230 may be coupled to a GUI that allows the operator to select the components being analyzed from a list and/or by manually inputting the identifier. Thereafter, the component characteristics are populated to the mathematical model 220 from the data store 230 based on the user's input. The GUI can be similar to the GUI 300 of FIG. 3A.

Figure 3B:
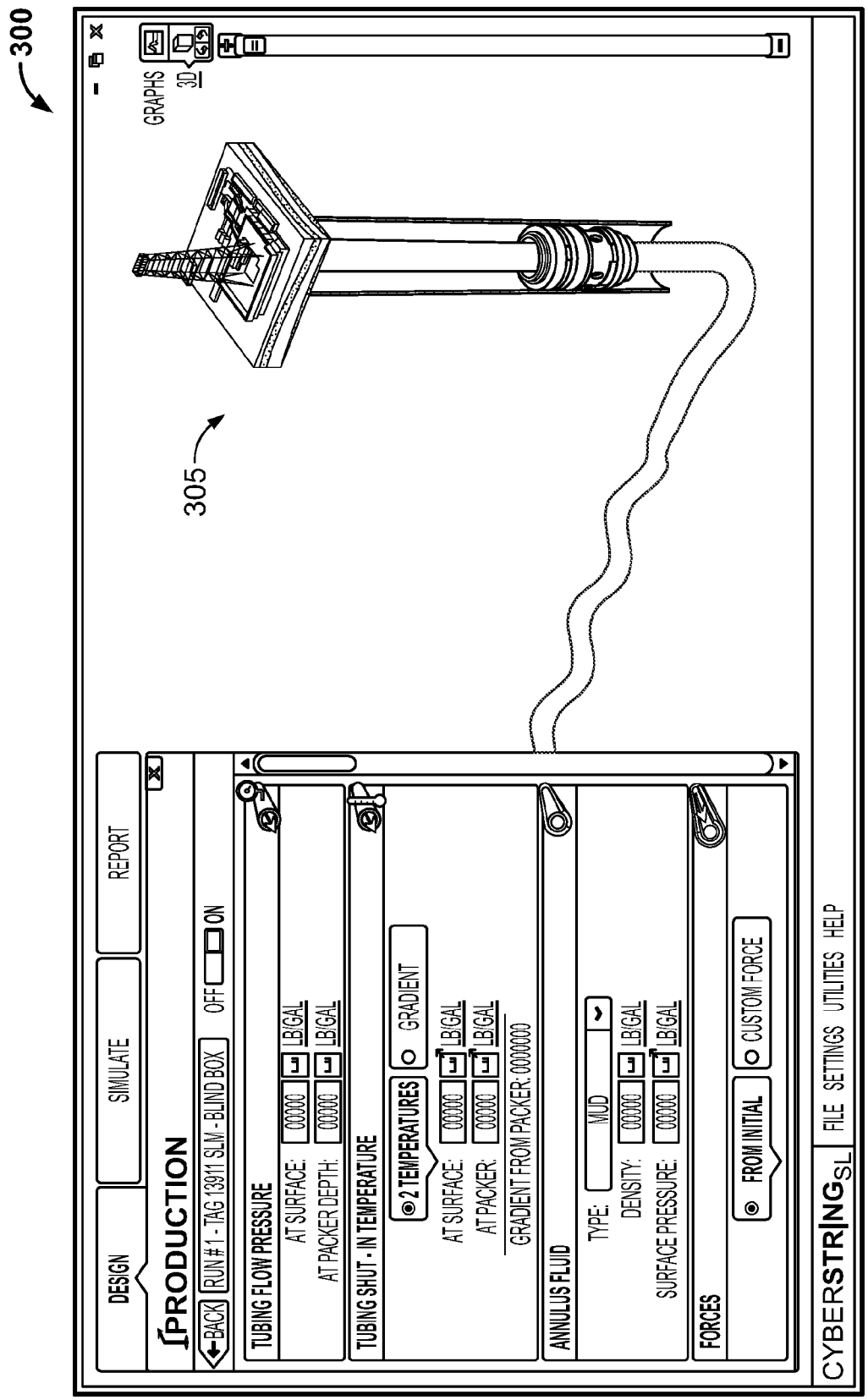

The fluid characteristics include information about the fluids in the well and the tool string. Some examples can include static characteristics such as fluid type (e.g., gas, liquid, mixture), fluid viscosity, fluid density, pressures inside and out of the tool string and within the well at the surface and (if available) downhole, temperatures at different portions along the length of the well and other information. The fluid characteristics can also include dynamic characteristics such as flow rate, pressures inside and out tool string and within well, and other information. Some or all of this information could be provided at approximately the same time as it is occurring in the real-world, for example, in real time. Additional or different information could be provided. In FIG. 2, the data store 230 can also be used and populated with a database of fluid characteristics. As above, the data storage and 30 may be coupled to a GUI that allows the operator to select the fluids in a well from a list and/or by manually inputting and identifier. Thereafter, the characteristics of fluid are populated to the mathematical model 220 from the data store 230 based on user's input. FIG. 3B shows another view of the GUI 300 for facilitating an operator's access to the information in data store 230, and includes pull down menus with lists of particular fluids and fluid characteristics.

The other characteristics can include other information that the mathematical model 220 can account for. Some examples of other characteristics include how much force can be applied to the tool string from the surface (e.g., by the rig)

and/or equipment in the well (e.g., by a well tractor), safety factors, and other characteristics. In certain instances, the other characteristics can include the real-world tool string position and orientation information and other information at approximately the same time as it is occurring in the real-world, for example, in real time. Additional or different information could be provided.

Some example inputs 245 include tool length, tool OD profile, tool weight, cable diameter, cable stretch coefficient, cable breaking strength, cable weight in air, cable weight in water, cable drum crush caution, cable drum crush warning, cablehead weak point design, allowable % breaking strength, borehole diameter profile, borehole fluid density, borehole fluid viscosity, borehole temperature profile, borehole coefficient of friction profile, well trajectory profile (MD, INC, AZI), borehole roughness, trajectory eccentricity, tool stress limitations, run in hole/pull out of hole (RIH/POOH) running speed, surface pressure, wellhead friction, flowrate for gas and liquids, 2D ID profile, and/or others.

The mathematical model 220 simulates passage of the tool string through the interval of the well, performing calculations based on the input characteristics to determine whether the tool string, under the specified conditions input into the model (including the available force to drive the tool string), will pass axially, uphole and/or downhole, through the interval of the well without exceeding specified stress limits of the tool string or its associated line, if line deployed. In addition, the mathematical model 220 can determine the forces involved in moving the tool string axially in the interval of the well, including the axial forces required to move the tool string and the reaction forces between the tool string and well. In evaluating operation of the tool string and tools thereof, the input characteristics are additionally used to determine local reaction forces that would reduce the effectiveness of tools that move in the well when operating.

For simplicity, the mathematical model 220 assumes the tools of the tool string are uniform diameter, and does not take into account the shape of the outwardly facing, lateral surfaces of the tool string. Similarly, the mathematical model 220 assumes that the surfaces of the well directly adjacent the tool string are uniform diameter, and does not take into account the shape of the inwardly facing, lateral surfaces of the well. Thus, in general terms, the calculations determine whether a long cylindrical solid body (i.e., the tool string) can pass through a long cylindrical tube (i.e., the well) and the forces involved. The mathematical model 220 accounts for the tube's changes in trajectory (e.g., bends, cork-screwing, and the like) and the resulting reaction forces and frictional forces between the cylindrical body and the cylindrical tube as the cylindrical body must bend to traverse the changes in trajectory, otherwise deforms under loads, and expands and contracts due to temperature and pressure. The mathematical model 220 additional accounts for external forces acting on the cylindrical body, such as fluidic forces, push/pull on the tool string and/or the line, and gravity.

The mathematical model 220 provides the calculated information above in outputs 260. The outputs 260 include the values of such information in the form of single outputs, tables and graphs. In certain instances, the outputs 260 include values of the calculated information correlated to the locations in the interval to which they relate, for example, force versus depth tables or graphs, deformation versus depth tables or graphs, and other. The information can yield a surface tubing/cable force profile indicating the forces needed to be applied to the tubing/cable at the surface rig to push and/or pull the tool string through specified locations in the interval of the wellbore, given the frictional and other forces acting on along the length of the tool string and/or line resisting the surface force. Correspondingly, the information can yield the force realized, in pull and/or push, in the tool string or line supporting the tool string at specified locations along the length of the well, including at the line-to-tool string connection, given the force input at the surface and the frictional and other forces acting along the length of the tool string and/or line resisting that force. The mathematical model 220 can also determine the axial deformation of the tool string and/or line supporting the tool string at specified locations in the interval due to the applied forces.

Some example outputs 260 include surface cable tension profile, downhole cablehead tension profile, maximum flow/injection rate profile, maximum overpull profile, cable stretch profile, well contact force profile, axial effective force profile, and/or others.

In evaluating operation of the tool string and tools thereof, the mathematical model 220 can determine the forces involved in moving a portion of a tool in the tool string at a specified location in the well. For example, in the context of the tool having a portion that is or can potentially be in contact with a surface of the well and that moves relative to the well, the reaction forces between the moving portion of the tool and the well can affect the force available to act on and move the moving portion. Additionally, the reaction forces between other portions of the tool string and the surfaces of the well can affect the force available to act on and move the moving portion of the tool whether or not the moving portion of the tool is or can potentially be in contact with a surface of the well. The moving portion of the tool may also be coupled to an actuator that provides force to move the moving portion (e.g., hydraulic, electric, pneumatic, spring and/or other type of actuator). Other components in the tool string and their arrangement in the tool string, for example, due to their weight, damping/stiffness characteristics, dynamic characteristics including if and how they are moved relative to the moving portion (e.g., dropped, pushed or pulled) and other characteristics, may affect the force available to act on and move the moving portion. Finally, external forces acting on the tool string and/or tool can affect the force available to act on and move the moving portion. In evaluating operation of the tool string, the mathematical model 220 can account for each of these factors and calculate the net force required and/or available to move the moving portion. For example, in the context of a jarring tool or a setting tool, the mathematical model 220 can determine the jarring force or the setting force (uphole and/or downhole) the tool can provide when operated at a specified location in the interval of the well. The information can be output as outputs 260.

Finally, in certain instances, the mathematical model 220 can be operated concurrently with the real-world operations it is modeling to perform some or all of the analysis described above and provide the outputs 260 at approximately the same time, accounting for time taken to perform the computing, that the information output is occurring in the real-world.

The 3D geometric model 215 performs a similar analysis to the mathematical model 220, however, using a more complex approximation of the tool string geometry and the well geometry to determine whether the tool string can pass through an interval of the well. Specifically, the 3D geometric model 215 takes into account surface shape features of the tool string and well by using information from 3D solid models. The information includes not only information about the shape of the end facing surfaces of the tool string and the well, but also information about the shape of the outwardly facing, lateral surfaces of the tool string and inward facing, lateral surfaces of the well directly adjacent that contact or potentially contact the tool string. As a result, the 3D geometric model 215 can predict interactions in the geometries of the tool string and the well that an approximation assuming a constant diameter, such as in the mathematical model 220, cannot. With this 3D information the 3D geometric model 215, thus, can determine whether the tool string can pass through an interval of the well, the forces acting on the tool string, and tools thereof, at various locations along the interval, and how much force is needed to be applied to the tool string to pass the tool string downhole through the well interval and/or uphole through the interval. In certain instances, like the mathematical model 220, the 3D geometric model 215 can use the force information in evaluating operation of the tool string and tools thereof.

The 3D geometric model 215 can receive the same or similar inputs 240 as the inputs 245 into mathematical model 220, including tool string characteristics, the well string characteristics, the fluid characteristics, and other characteristics. Additionally, the 3D geometric model 215 receives three-dimensional data about the tool string and the well. In certain instances, the 3D geometric model 215 can be operated concurrently with the real-world operations it is modeling and provide information on passage of the tool string and the forces involved at approximately the same time, accounting for time taken to perform the computing, that the modeled tool passage forces are happening in the real-world. For example, the 3D geometric model 215 may be operated to model the real-world in real time. Certain of the inputs 245 can be provided to the 3D geometric model 215 without substantial or intentional delay, for example, in real time.

Some example inputs 245 into the 3D geometric model 215 include surface cable tension profile, downhole cablehead tension profile, well contact force profile, axial effective force profile, tool length, tool OD profile, tool weight, borehole diameter profile, borehole fluid density, borehole fluid viscosity, borehole temperature profile, borehole coefficient of friction profile, well trajectory profile (MD, INC, AZI), borehole roughness, trajectory eccentric, tool stress limitations, run in hole/pull out of hole (RIH/POOH) running speed, tool flex joints, tool knuckle joints, tool standoff profile, tool decentralizer profile, tool centralizer profile, tool mobility—roller boogie profile, formation compaction projected dynamic profile, thermal induced mechanical distortion profile, 2D ID profile and/or others.

In FIG. 2, the 3D geometric model 215 is coupled to a data store 225 that includes a database of three-dimensional data, for example extracted from solid models and/or physical measurements, of the tools and other components of the tool string and the well components, for example, identified by manufacturer, model number, size and pressure rating. As above, the data store 225 may be coupled to a GUI that allows the operator to select components being analyzed from a list and/or entered manually. Thereafter, the tool/component characteristics are populated to the geometric model 215 from the data store 225 based on the user's input.

In certain instances, the 3D geometric model 215 can be configured to operate in concert with the mathematical model 220, such that some inputs 240 to the geometric model 215 are outputs 260 from the mathematical model 220. Therefore, in addition to the tool string characteristics, well string characteristics, fluid characteristics, and other characteristics described above, the 3D geometric model 215 can take as inputs 240 information on the axial force required to pull or push the tool string through a specified location in the interval of the well and the corresponding contact reaction forces imposed on the tool string provided as outputs 260 from the mathematical model 220. In certain instances, this information can include the surface tubing/cable force profile in the force at the line to tool string connection. In instances where the 3D geometric model 215 is configured to operate as a stand-alone model, it need not receive information from the mathematical model 220.

Like the mathematical model 220, the 3D geometric model 215 simulates passage of the tool string through the interval of the well, performing calculations based on the input characteristics to determine whether the tool string, under the specified conditions input into the model (including the available force to drive the tool string), will pass axially, uphole and/or downhole, through the interval of the well without exceeding specified stress limits of the tool string or its associate line, if line deployed. In addition, in certain instances, the 3D geometric model 215 can determine the forces involved in moving the tool string axially in the interval of the well, including the axial forces required to move the tool string and the reaction forces between the tool string and well. The calculations performed by the 3D geometric model 215, in certain instances, can be similar to those described above with respect to the mathematical model 220 and/or in Basic Tubing Forces Model (TFM) Calculation, Tech Note CTES, L.P., 2003, mentioned above. However, unlike the mathematical model 220, the analysis performed by the 3D geometric model 215 additionally models and accounts for the 3D shape of the end facing and lateral surfaces of the tool string and the well and how they interact. This analysis is over and above the effects that surface finish, for example, would have on friction, and takes into account how recessed or upstanding features of one can engage recessed or upstanding features of the other and how the shapes of those features will interact to resist or lock the tool string against movement. Thus, in general terms, the 3D geometric model 215 determines whether the tubing string, including the 3D features of its end facing and lateral surfaces, can pass through the well, including the 3D features of its end facing and lateral surfaces, and the forces involved. The 3D geometric model 215 accounts for the well's changes in trajectory (e.g., bends, cork-screwing, and the like) and the resulting reaction forces and frictional forces between the tubing string (including the 3D features) and the well (including the 3D features) as the tubing string must bend to traverse the changes in trajectory, otherwise deforms under loads, and expands and contracts due to temperature and pressure. The geometric model 215 additionally accounts for external forces acting on the tubing string, such as fluidic forces, push/pull on the tool string and/or the line, and gravity. This modeling can be considered 3D and evaluates relative positions of the tool string with respect to the wellbore it is traveling through, and is not restricted to evaluating to tool moving on the low side of the wellbore.

In certain instances, the 3D geometric model 215 can be operated concurrently with the real-world operations it is modeling and provide information on passage of the tool string and the forces involved at approximately the same time, accounting for time taken to perform the computing, that the modeled tool passage forces are happening in the real-world. For example, the model 215 may be operated to model the real-world in real time.

The 3D geometric model 215 uses the inputs 240 and/or inputs from the mathematical model 220 to determine the position of the tool string in three-dimensional space relative to the well and the reaction forces between the tool string and the contacting surfaces of the well, both accounting for deflection of the tool string. The reaction forces can include frictional forces, as well as contact force due to gravity and deformation of the tool string, for example, from traversing a bend in the well, from buckling of the tool string and/or other. Other forces can be accounted for. The 3D geometric model 215 then, using the 3D data about the surfaces of the tool string and the well, simulates passage of the 3D surfaces of the tool string across the corresponding surfaces of the well when subjected to the calculated forces and determines how the surfaces interact. In this analysis, the 3D geometric model 215 can identify where features of the tool string (upstanding above or recessed below surface roughness) engage features of the contacting well surfaces (upstanding above or recessed below surface roughness), and can simulate that interaction to determine the force the interfacing surfaces contribute to the total force necessary to move the tool string, or tools thereof, in a specified direction (e.g., uphole, downhole, rotationally, and/or other). The analysis takes into account the contact area between the features, the contact angle of the interfacing shapes of the features, the stiffness of the features and the remaining tool string and well, the frictional coefficient between the features and other characteristics. The analysis can further determine whether the interaction will cause the tool string to lock with the well in a state that would prevent movement in the specified direction being analyzed, given the total force necessary to move the tool string, the available force to move the tool string, and/or move the portion thereof, and/or the specified maximum stresses of tool string and/or well surfaces. The 3D geometric model 215 can further perform the analysis on specified portions of the tool string, for example corresponding with a tool or a portion of a tool in the tool string.

The 3D geometric model 215 provides the information above in outputs 255. The outputs 255 include the values of such information in the form of single outputs, tables and graphs. In certain instances, the outputs 255 include values of the calculated information correlated to the locations in the interval to which they relate, for example, force versus depth tables or graphs, deformation versus depth tables or graphs, and other. The information can yield a surface tubing/cable force profile indicating the forces needed to be applied to the tubing/cable at the surface rig to push and/or pull the tool string through specified locations in the interval of the wellbore, given the frictional and other forces acting on along the length of the tool string and/or line resisting the surface force. Correspondingly, the information can yield the force realized, in pull and/or push, in the tool string or line supporting the tool string at specified locations along the length of the well, including at the line-to-tool string connection, given the force input at the surface and the frictional and other forces acting along the length of the tool string and/or line resisting that force. The geometric model 215 can also determine the axial deformation of the tool string and/or line supporting the tool string at specified locations in the interval due to the applied forces.

Some example outputs 255 include effective deployment probability, surface cable tension profile, downhole cable-head tension profile, maximum flow/injection rate profile, maximum overpull profile, cable stretch profile, well contact force profile, axial effective force profile, 3D ID profile, and/or others.

In evaluating operation of the tool string and tools thereof, the 3D geometric model 215 can determine the forces involved in moving a portion of a tool in the tool string at a specified location in the well, accounting for the interaction of features on the end and lateral facing surfaces of the tool string and well. For example, in the context of the tool having a portion that is or can potentially be in contact with a surface of the well and that moves relative to the well, the reaction forces between the moving portion of the tool and the well can affect the force available to act on and move the moving portion. Additionally, the reaction forces between other portions of the tool string and the surfaces of the well can affect the force available to act on and move the moving portion of the tool whether or not the moving portion of the tool is or can potentially be in contact with a surface of the well. The moving portion of the tool may also be coupled to an actuator that provides force to move the moving portion (e.g., hydraulic, electric, pneumatic, spring and/or other type of actuator).

Other components in the tool string and their arrangement in the tool string, for example, due to their weight, damping/stiffness characteristics, dynamic characteristics including if and how they are moved relative to the moving portion (e.g., dropped, pushed or pulled) and other characteristics, may affect the force available to act on and move the moving portion. Finally, external forces acting on the tool string and/or tool can affect the force available to act on and move the moving portion. In evaluating operation of the tool string, the 3D geometric model 215 can account for each of these factors and calculate the net force required and/or available to move the moving portion. For example, in the context of a jarring tool or a setting tool, the 3D geometric model 215 can determine the jarring force or the setting force (uphole and/or downhole) the tool can provide when operated at a specified location in the interval of the well. The information can be output as outputs 260.

Finally, in certain instances, the 3D geometric model 215 can be operated concurrently with the real-world operations it is modeling to perform some or all of the analysis described above and provide the outputs 255 at approximately the same time, accounting for time taken to perform the computing, that the information output is occurring in the real-world.

Figure 4A:
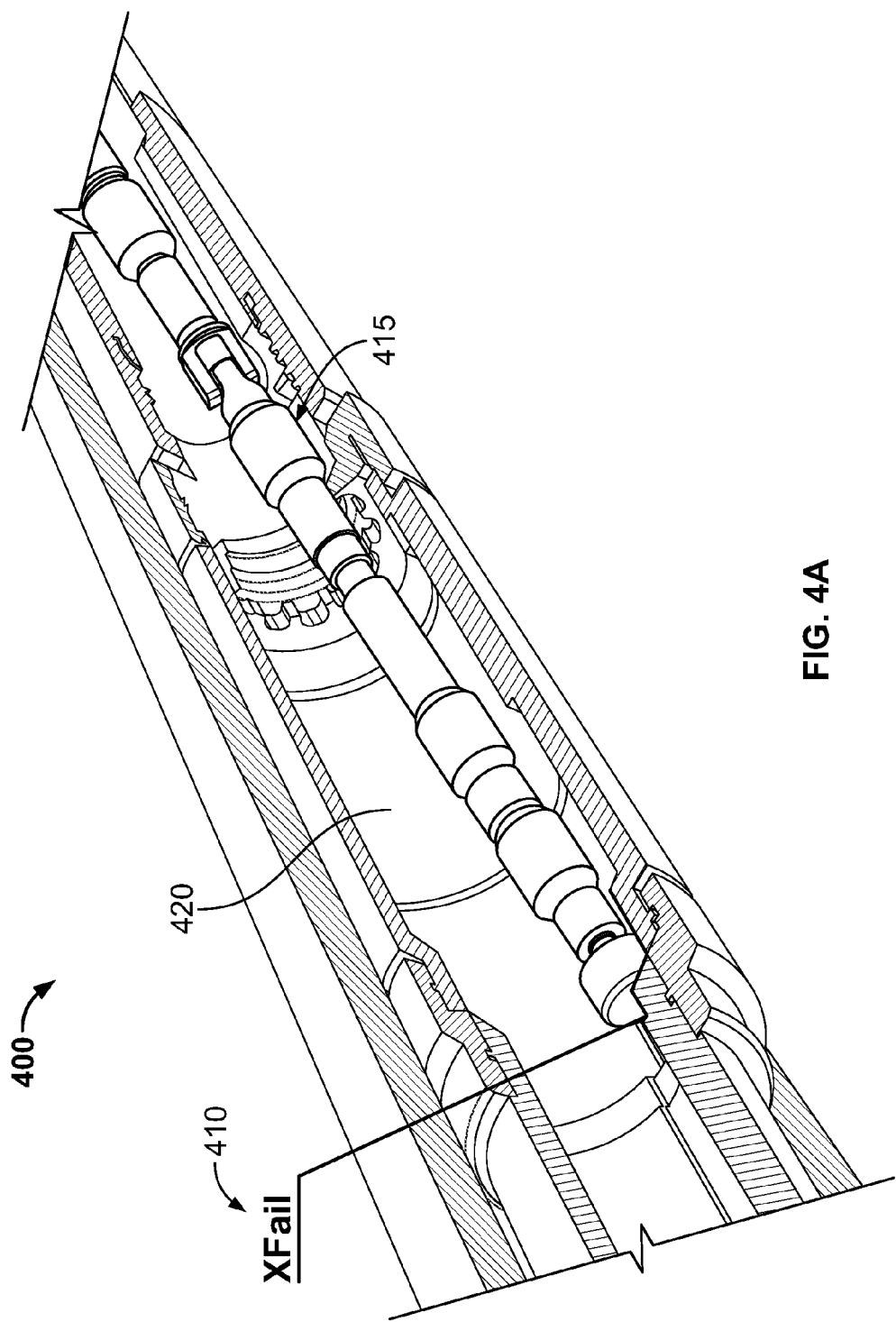
FIGS. 4A-4B illustrate example graphical outputs of a 3D modeling system.
Figure 4B:
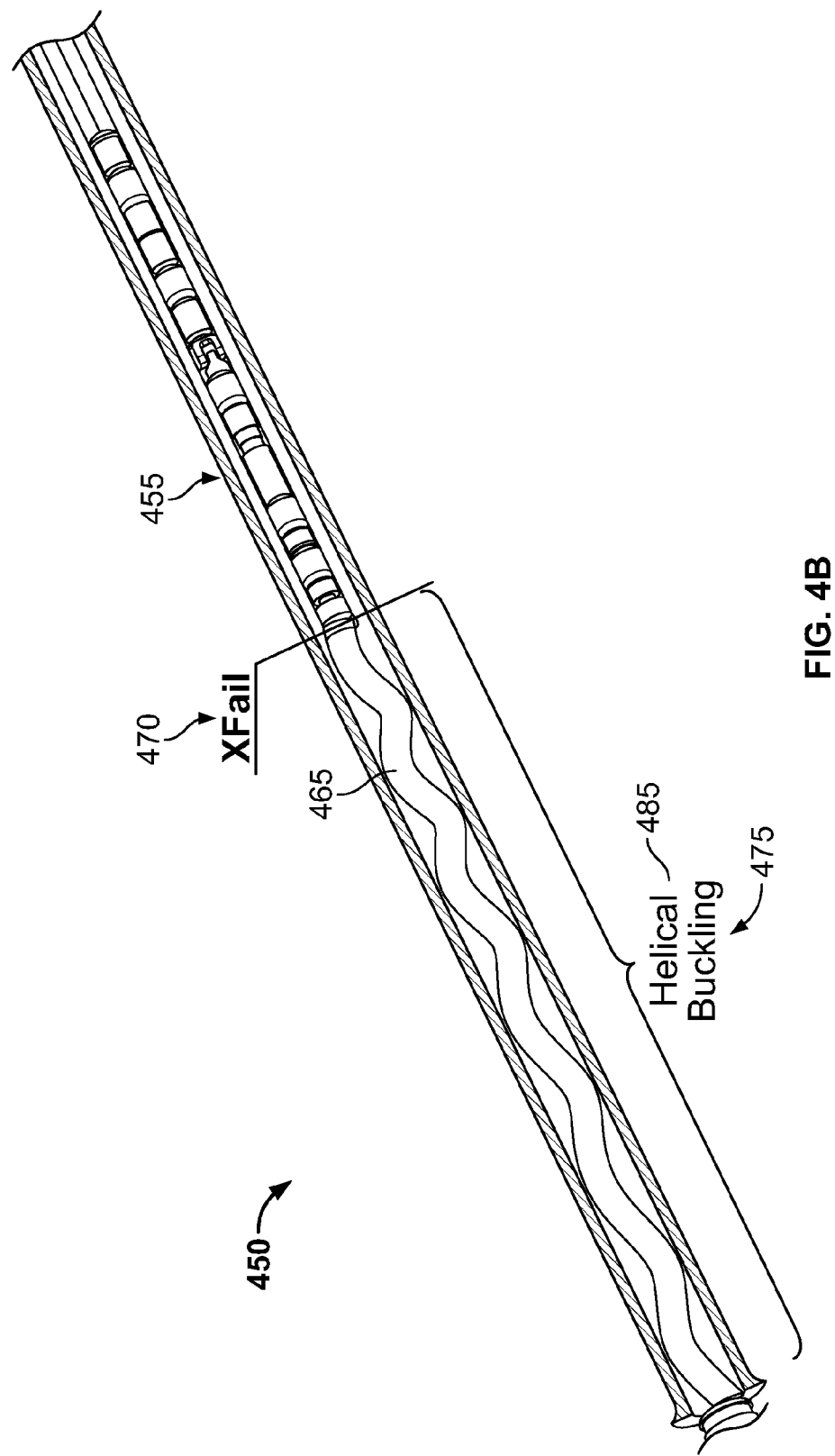

Additionally, because the 3D geometric model 215 operates on 3D data, the 3D geometric model 215 can provide, as outputs 255, a display with a real-world looking graphical depiction of the tool string and well, and particularly, a graphical depiction of how the features of each interact. FIGS. 4A and 4B, discussed below, are examples of such a graphical depiction. In certain instances, the display can depict the tool string and well interaction, and forces involved, at approximately the same time it is happening in the real-world. For example, the 3D geometric model 215 can display the tool string and well interactions, and forces involved, in real time. This allows the operator to follow along as the tool string is being inserted or withdrawn from the well, visualize the interactions between the tool string and well, and evaluate and address any issues at approximately the same time as it is happening in the real-world.

FIG. 4A shows an example display with a real-world looking depiction 400 of the tool string 415 and well 420 that can be an output 255. In the example, a blunt leading end face of a tool string 415 is encountering an abrupt reduction in diameter of the inner surface of the well completion tubular 420 at a tool/well interface labeled 410 by the system as "Fail." The leading end face abuts the abrupt reduction in diameter that increases the force necessary to move the tool string 415 downhole (to the left of the figure) relative to the well completion tubular 420, and may lock the tool string 415 against further downhole movement. Here, the tendency for the tool string 415 to engage with the tubular 420 is exacerbated because the tool string 415 contains a knuckle joint that has allowed the leading portion of the tool string 415 to drop into the increased diameter portion of the tubular 420. The 3D geometric model 215, takes into account the stiffness of the tool string 415, including the depicted knuckle joint and its position in the tool string 415. The display allows an operator to visualize the interaction between surfaces of the tool string 415 and well completion tubular 420 to better understand what aspects of the interaction are causing the problems, and to evaluate whether the 3D graphical model's analysis is correct.

FIG. 4B shows another example display 450 with a real-world looking depiction of the tool string 455 and well 475 that can be an output 255. In the example, the well 475 has a wellbore portion 485 with a large degree of helical or sinusoidal buckling, and due to the stiffness of the tool 455, the tool is unable to pass. The beginning of the buckling is labeled 470 by the system as "Fail." As above, this display allows an operator to visualize the interaction between the surfaces of the tool string 455 and the well 475 to better understand what aspects of the interaction are causing the problems, and to evaluate whether the 3D graphical model's analysis is correct.

The illustrated tool passage modeling system 200 also includes the adaptive machine learning model 210, which receives inputs 250 and provides outputs 270 based on the inputs 250 and data retrieved from a history store 235 (e.g., database or repository). Generally, the adaptive machine learning model 210 utilizes historical data stored in the history store 235 (e.g., geometric and solid model data for well tool strings, geometric data for wellbore designs, wellbore trajectory (MD, INC, AZI), historical downhole tool forces measured downhole (accelerometers, tension/compression) and tool passage data based on the combination of such solid model data and designs) to predictively determine, for instance, tool passage success, tool passage success probability, and other outputs. Generally, the adaptive machine learning model 210 is a learning machine having "artificial intelligence" that utilizes algorithms to learn via inductive inference based on observing data that represents incomplete information about statistical phenomenon and generalize it to rules and make predictions on missing attributes or future data. Further, the adaptive machine learning model 210 may perform pattern recognition, in which the adaptive machine learning model 210 "learn" to automatically recognize complex patterns, to distinguish between exemplars based on their different patterns, and to make intelligent predictions on their class.

At a high level, the adaptive machine learning model 210 may retrieve inputs 250 (e.g., measurement values and recorded tension, accelerometer and other forces from logging data, tool and cable movement characteristic information), data from the tools/well/fluids specifications store 230, and data from a history store 235 to perform clustering and classification in characterizing borehole trajectory, geometry and feasibility of deployment (e.g., passage of the well tool string through a portion of the wellbore or other tubular). The adaptive machine learning model 210 may also, based on the inputs 250 and/or data from the stores 230 and 235, interpret deployment simulation results and generate graphical outputs depicting such results.

In some embodiments, the adaptive machine learning model 210 comprises an artificial neural network machine learning system that includes an algorithm of interconnected nodes, where each node is a sub-algorithm that performs data manipulation on inputs (such as inputs 250). The interconnections between the nodes may be directed so that data from one node is directed to a specific subset of the other nodes, and weighted to influence how the data is operated on by the receiving node. The artificial neural network may be calibrated by providing it an input and the desired output, and the neural network operates to adjust the path of the interconnections and their weights (via back propagation) so that next time it receives the input it will output the desired output. By providing the neural network multiple inputs and their corresponding desired outputs, it eventually learns an algorithm that will yield the desired output for each input. Given an entirely new input, the neural network may effectively predict what the output should be.

In some embodiments, the adaptive machine learning model 210 comprises a support vector machine (SVM) that analyzes data and recognize patterns, and may be used for classification and regression analysis. For example, the adaptive machine learning model 210 may receive the inputs 250 and predict, for each given input 250, which of two possible classes comprises the input 250. In other words, the adaptive machine learning model 210 as an SVM may be a classifier that provides a binary output (e.g., tool passage or no tool passage). Typically, a support vector machine constructs a hyperplane or set of hyperplanes in a high- or infinite-dimensional space, which can be used for classification, regression, or other tasks.

Some example inputs 250 include: tool length, effective deployment probability, tool OD profile, downhole cablehead tension profile, surface cable tension profile, tool OD profile, historical comparison analysis, tool weight, maximum flow/injection rate profile, well contact force profile, multiple tool string deployment probability, cable diameter, maximum overpull profile, axial effective force profile, cable diameter, optimized tool string design from constrained components, cable stretch coefficient, cable stretch profile, tool length, ordered tool suggestions from constrained string options, cable breaking strength, well contact force profile, tool OD profile, cable breaking strength, surface cable tension profile, axial effective force profile, borehole diameter profile, cable drum crush caution, borehole fluid density, 3D ID profile, cable drum crush caution, borehole fluid viscosity, borehole temperature profile, cablehead weak point design, allowable % breaking strength, borehole coefficient of friction profile, well trajectory profile (MD, INC, AZI), borehole roughness, trajectory eccentricity, borehole temperature profile, tool stress limitations, RIH ("run in hole")/POOH ("pull out of hole") running speed, tool flexibility—flex joints, tool standoff profile, tool decentralizer profile, tool centralizer profile, surface pressure, tool mobility—roller boogie profile, wellhead friction, formation compaction projected dynamic profile, flowrate for gas and liquids, thermal induced mechanical distortion profile, 2D ID profile, maximum flow/injection rate profile, wellbore corkscrew characteristics, previous deployment history in same wellbore, previous deployment history in similar wellbores, previous deployment history of all wellbores in database, tool accelerometer profile (RIH/POOH), 3D multi-finger mechanical caliper measurements, downhole camera optical survey, optical interpretation from downhole camera survey, other sensors or methods of evaluation, multiple tool string candidate designs for individual evaluation, and/or subsurface geomechanical dynamic predictions.

As described above, the illustrated tool/well/fluids specification store 230 includes a database of tools or other components that could be used in the tool string, for example identified by manufacturer, model number, size and pressure rating, correlated to their characteristics. The tools string characteristics may be retrieved by the adaptive machine learning model 210 from the data store 230 based on the inputs 250, for example. The well characteristics include information about the wellbore and the components, such as casing and completion string components, installed in the wellbore that make up the well. In certain instances, the geometric characteristics of the wellbore can be obtained from survey data, such as survey logs (having information on inclination relative to gravity and direction per depth), caliper logs (diameter per depth) and other data, and retrieved by the adaptive machine learning model 210. The geometric characteristics of the components installed in the wellbore can include the outside and inside diameters of the components at different positions along the length of the well, the lengths of the components, the types of components, their order in the well, the type of connection or other interface between the components, flow restrictions through the components, component weights, and other information. The well characteristics can also include material properties such as the types of material of the well components, the yield and plastic strength and elastic modulus of the materials, the frictional characteristics of the materials and other information. In certain instances, the well characteristics can include additional information beyond geometric and material characteristics.

The adaptive machine learning model 210 may also retrieve, from the data store 230, data including fluid characteristics about the fluids in the well and the tool string based on the inputs 250. As described above, some examples can include static characteristics such as fluid type (e.g., gas, liquid, mixture), fluid viscosity, fluid density, pressures inside and out of the tool string and within the well at the surface and (if available) downhole, temperatures at different portions along the length of the well and other information. The fluid characteristics can also include dynamic characteristics such as flow rate, pressures inside and out tool string and within well, and other information.

The illustrated history store 235 includes data such as geometric and solid model data for well tool strings, geometric data for wellbore designs, and tool passage data based on the combination of such solid model data and designs for previous RIH/POOH operations. For instance, combinations of geometric and solid model data for well tool strings and geometric data for wellbore (or other tubular) designs that have previously resulted in successful RIH/POOH operations (e.g., successful passage of a well tool string or elongate well tool through a portion of a wellbore or tubular) may be stored in the history store 235.

In a first step of a process performed by the adaptive machine learning model 210, inputs 250 may be received, for example, from a user or well operator. Such inputs 250 may define, for instance, well tool components, wellbore fluids, and information regarding the wellbore or other tubular. Based on such inputs 250, additional characteristics about the well tool or tool string to be modeled may be retrieved from the data store 230, as well as additional information of the fluids and/or wellbore or tubular to model. Next, the adaptive machine learning model 210 may search the data stored the history store 235 for matches (or "next-best" matches) to the specified and/or retrieved data regarding the tool string, wellbore, and/or fluids. For example, the adaptive machine learning model 210 may search and find instances of geometric and solid model data for well tool strings in the history store 235 that most closely resemble (or match) tool string data provided by inputs 250 and/or retrieved from the data store 230 based on the inputs 250. The adaptive machine learning model 210 may also search and find instances of geometric data for wellbore designs in the history store 235 that most closely resemble (or match) wellbore (or other tubular) data provided by inputs 250 and/or retrieved from the data store 230 based on the inputs 250.

In some embodiments, based on the history matching process described above, the adaptive machine learning model 210 may provide, through the outputs 270, a classification of the tool string provided by the user through the inputs 250 into one of two classes: passable through the wellbore as described by the inputs 250 or not passable through the wellbore as described by the inputs 250. In some embodiments, beyond such a binary classification, the adaptive machine learning model 210 may provide for a statistical probability of passage of the input tool string through the wellbore (e.g., 50% success, 75% success) based on the history matching process. In some embodiments, the outputs 270 may also include a graphical representation (e.g., as shown in FIGS. 4A-4B) of the classification determined by the adaptive machine learning model 210.

Figure 5:
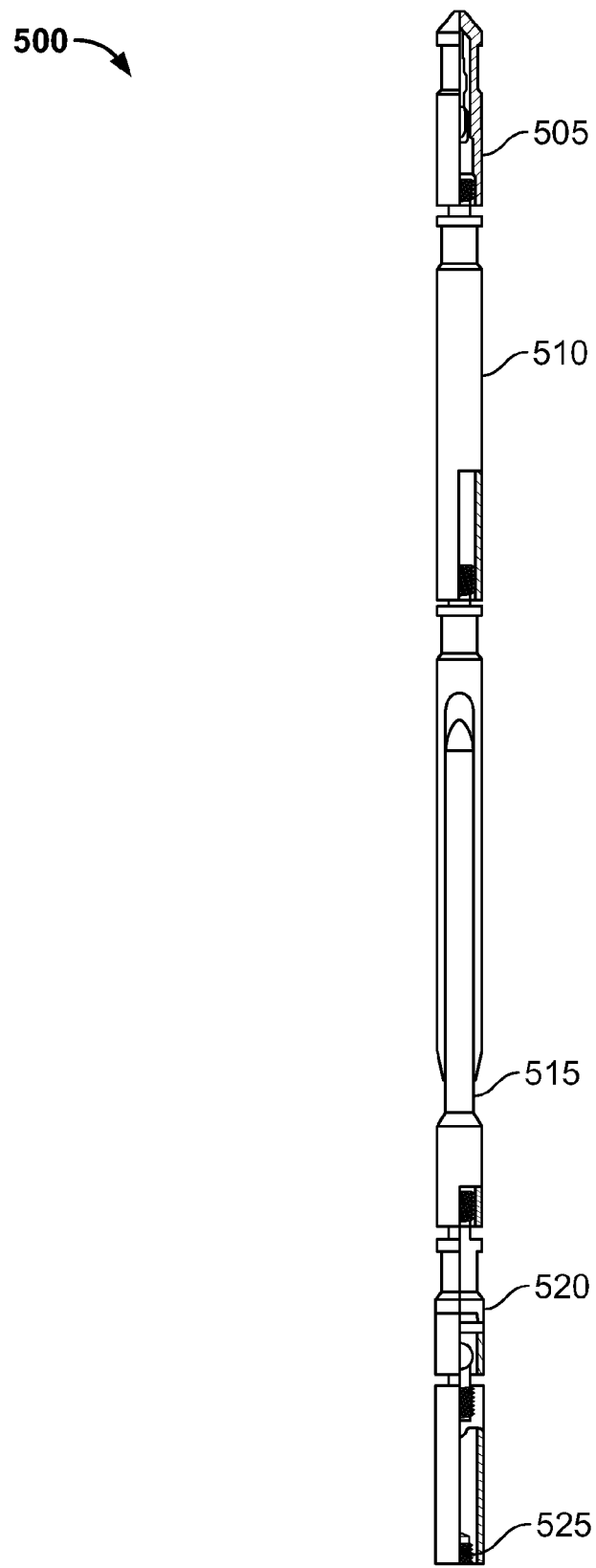
FIG. 5 illustrates an example well tool string that have particular geometrical characteristics.

As discussed above, the modules of the modeling system 200 can be used separately and/or together in modeling the effectiveness of the operation of a tool string. By way of example, FIG. 5 illustrates an example well tool string 500 that the modeling system can be used in modeling the effectiveness of operation. In some instances, the well tool string 500 may be all or a portion of the well tool string 125 shown in FIG. 1. In some embodiments, the well tool string 500 may be a subsurface line deployed tool string, operable to set, pull, or otherwise service subsurface devices in the well by applying an axial jarring force to the devices.

As illustrated, the well tool string 500 includes a wireline socket 505, a stem 510, one or more jars 515, a knuckle joint 520, and a pulling tool 525. The wireline socket 505 provides a connection of the line (e.g., a slickline, braided line, or other wireline) to the well tool string 500. The pulling tool 525 provides a connection to another device in the well (i.e., the device begin jarred). The stem 510 provides weight to the well tool string 500 to work in connection with jars 515 to apply an impact force, oriented uphole and/or downhole, to the device in the well. The jars 515 telescope in and out axially to allow the portion of the tool string 500, including the wireline socket 505, stem 510, and uphole portion of the jars 515, to be rapidly lifted uphole to apply an uphole impact load through the pulling tool 525 to the device, or lifted uphole and dropped downhole to apply a downhole impact load through pulling tool 525 to the device. The stem 510 may be designed with a particular size (e.g., length, outer diameter) and weight based on an impact force required to, for example, set subsurface controls or urge the well tool string 500 through the well. In certain instances, the impact force of the jars 515 may be assisted by springs and/or hydraulics in the jars 515 or as a part of an accelerator tool (not shown) in the tool string 500. In certain instances, the jars 515 may be detent jars that include a detent mechanism that retains the jar axially contracted until subjected to a specified uphole force that overcomes the detent mechanism. The knuckle joint 520, generally, include a ball and socket mechanism that allows improved angular bending mid-tool string.

The outer diameter of the jars 515 may drag on the well surfaces, and friction with the well surfaces and other forces such as fluidic forces, gravity, and friction on the line to the surface, react against movement of the jars 515 increasing the force needed to axially telescope the jars 515 in and out, and decreasing the impact load the jars 515 can provide. The modeling system 200 (FIG. 2) can determine the forces that react against the telescoping movement, and allow the operator to evaluate multiple different configurations of the tool string 500 to select the tool string configuration that can achieve a specified or maximum force applied by the jarring operation to the device in the well. The mathematical model 220, 3D geometric model 215, and/or adaptive learning model 210 can be used individually or in concert to evaluate the operation of different tool string configurations.

The modeling system 200 can account for the effect and placement of certain tools in the tool string 500, including the stroke and spring constant of accelerators, the stroke and release force of detent jars, wire stretch relationship to detent jars, stem location and weight, well inclination and resulting gravitational and frictional forces, line tension at the surface versus line tension at the socket 505, the momentum of moving portions of the tool string 500 as affected by forces resisting the movement and/or other aspects accounted for by the modeling system 200. For example, the operator may use the modeling system 200 in selecting the release force of the detent jars by modeling the line tension at the socket 505, and selecting the release force of the detent jars in relation to the forces acting on the jar 515 and the maximum allowable tension at the socket 505. Additionally, the operator may use the modeling system 200 to determine the effect that selecting a particular detent jar release force will have on the impact force that the tool string 500 is able to produce in given well conditions. The operator can test other configurations of the well string 500 using the modeling system 200, for example having different weight stems, accelerators of different spring rate and stroke, and other configurational changes that effect the impact force that the tool string 500 is able to produce in the given well conditions. The operator can then select, for example, the configuration of tool string 500 that produces the greatest application of jarring force to the device in the well.

Figure 6A:
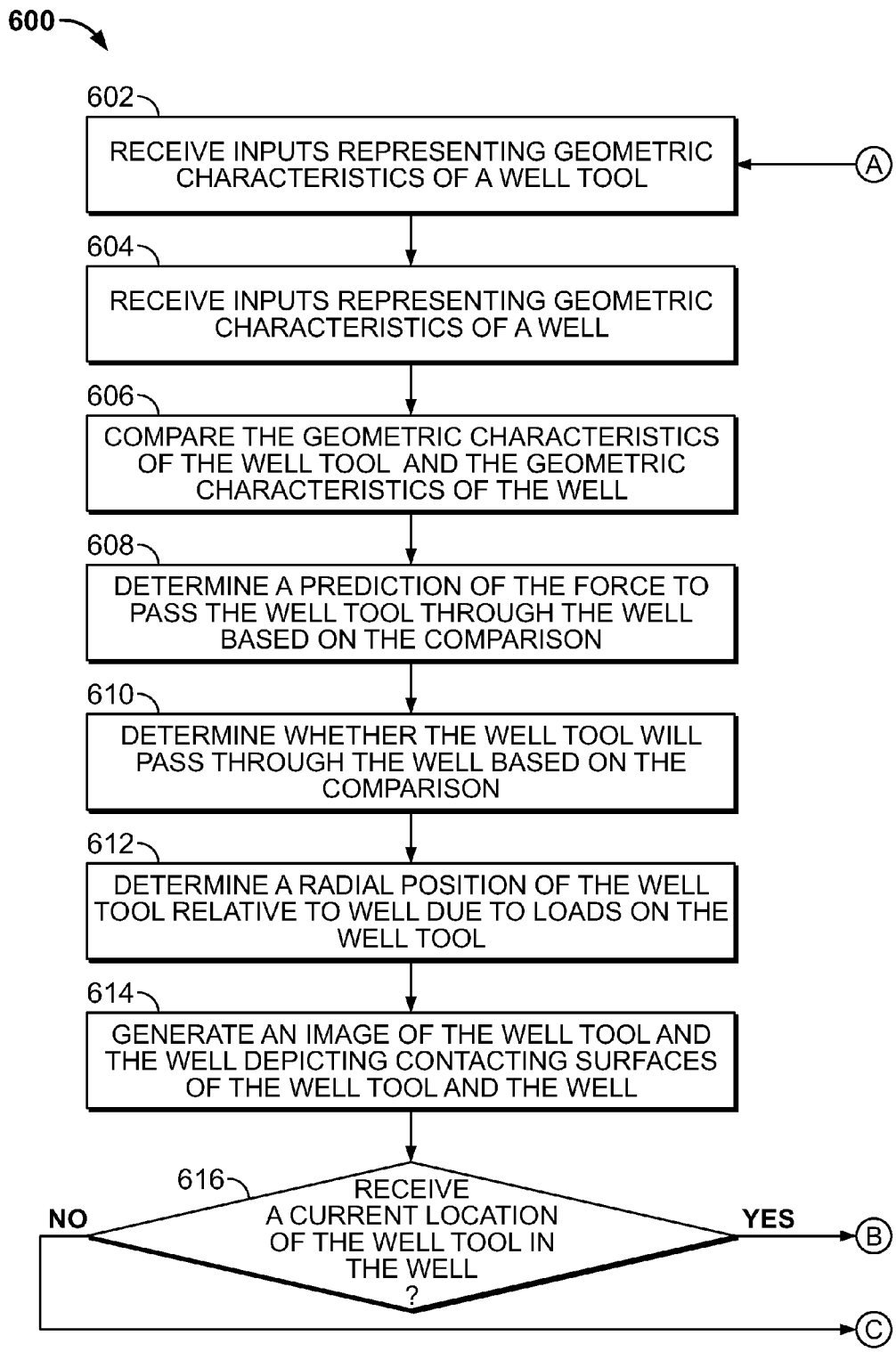
FIGS. 6A-6B are flowcharts describing example methods for modeling passage of a well string through a portion of a well.
Figure 6A:
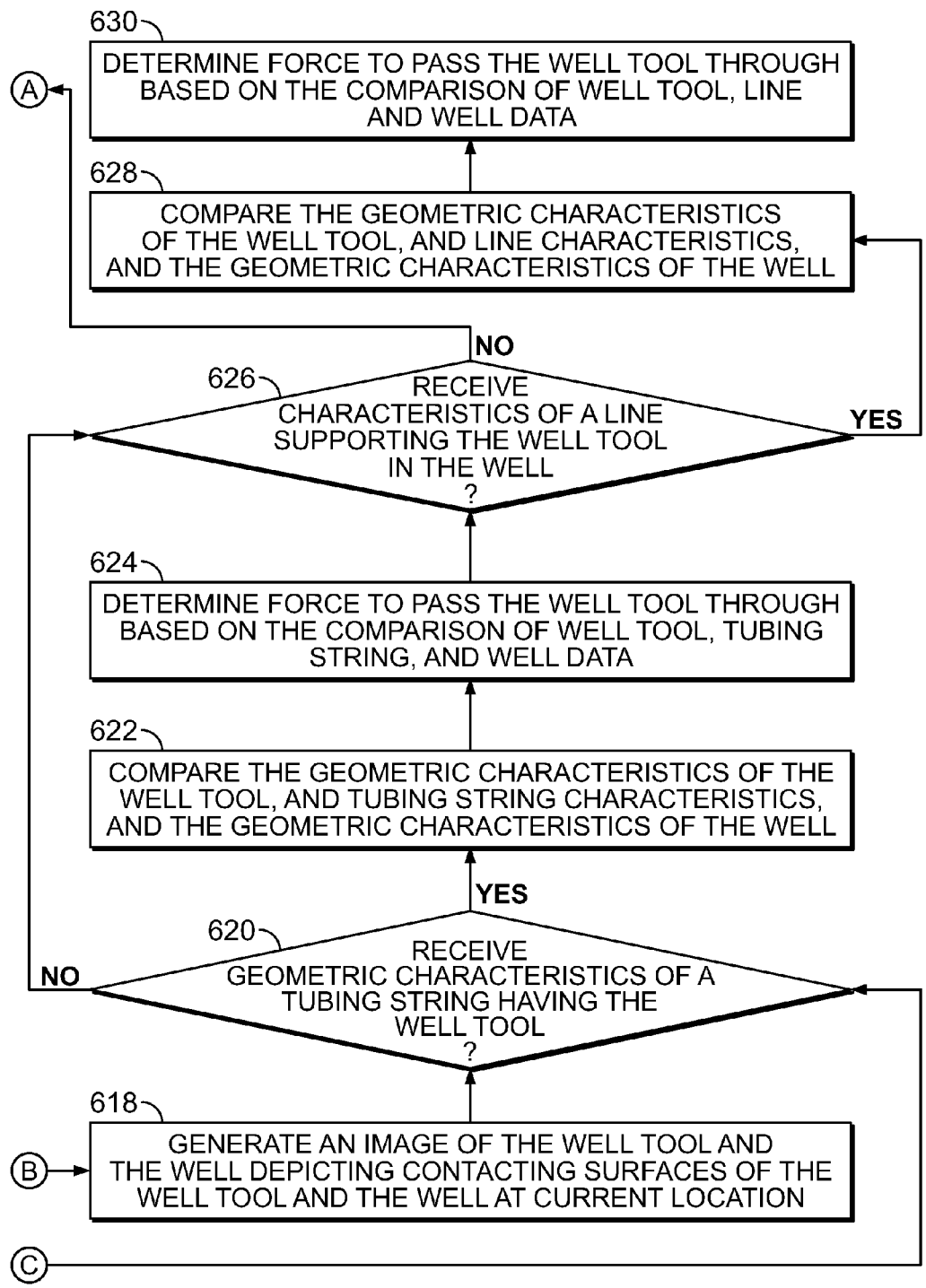
Figure 7A:
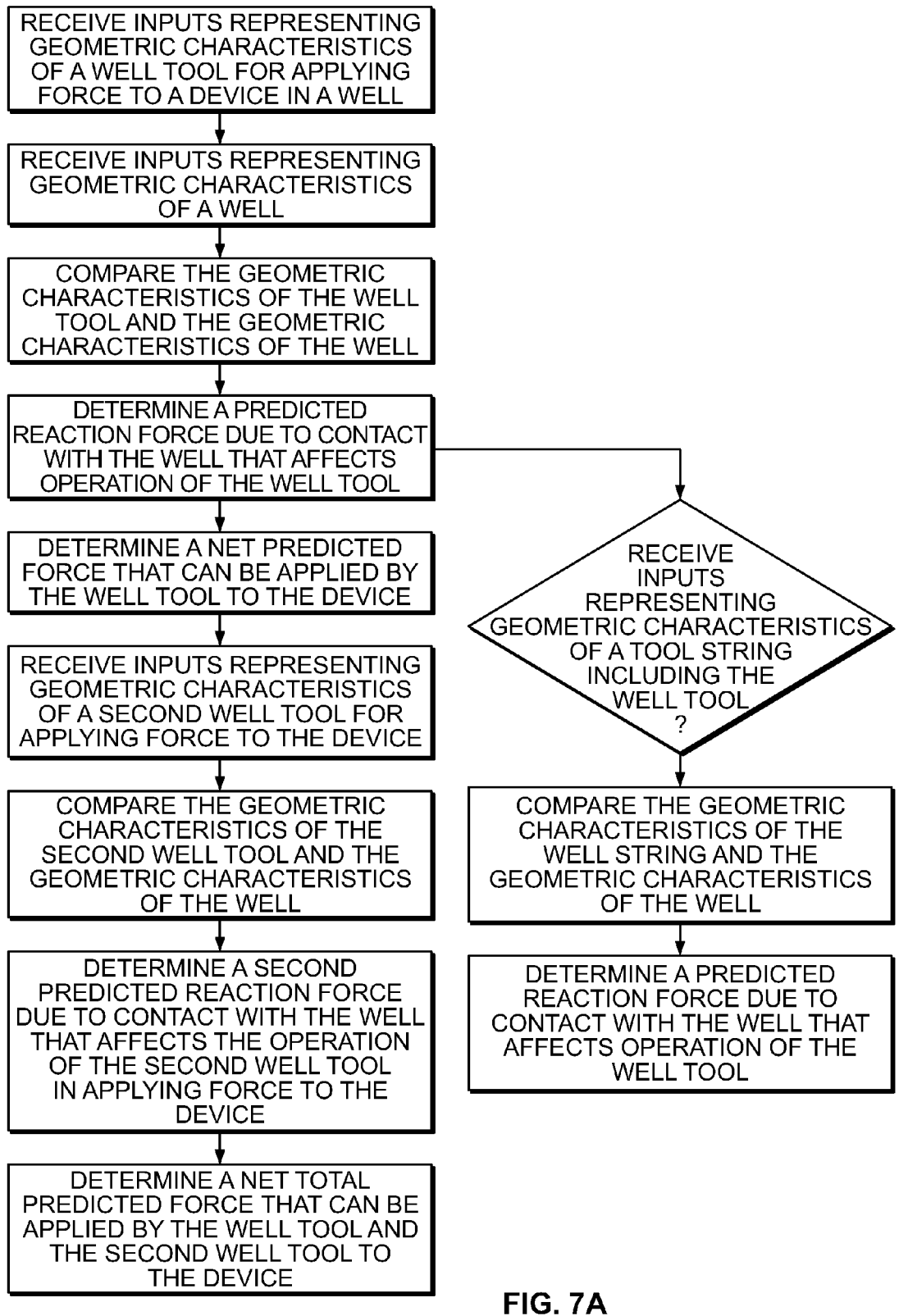
FIGS. 7A-7B are flowcharts describing example methods for modeling operation of a well tool in applying a force to a device in a well.
Figure 7B:
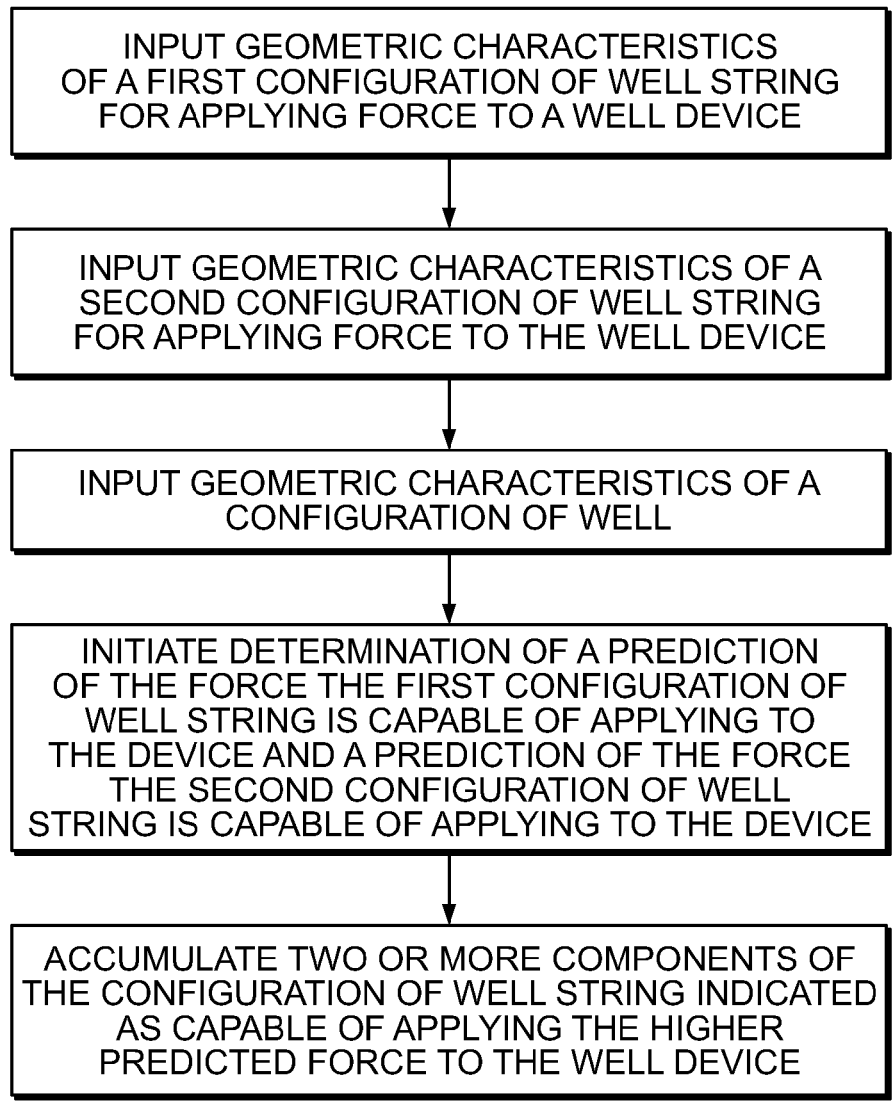
Figure 8A:
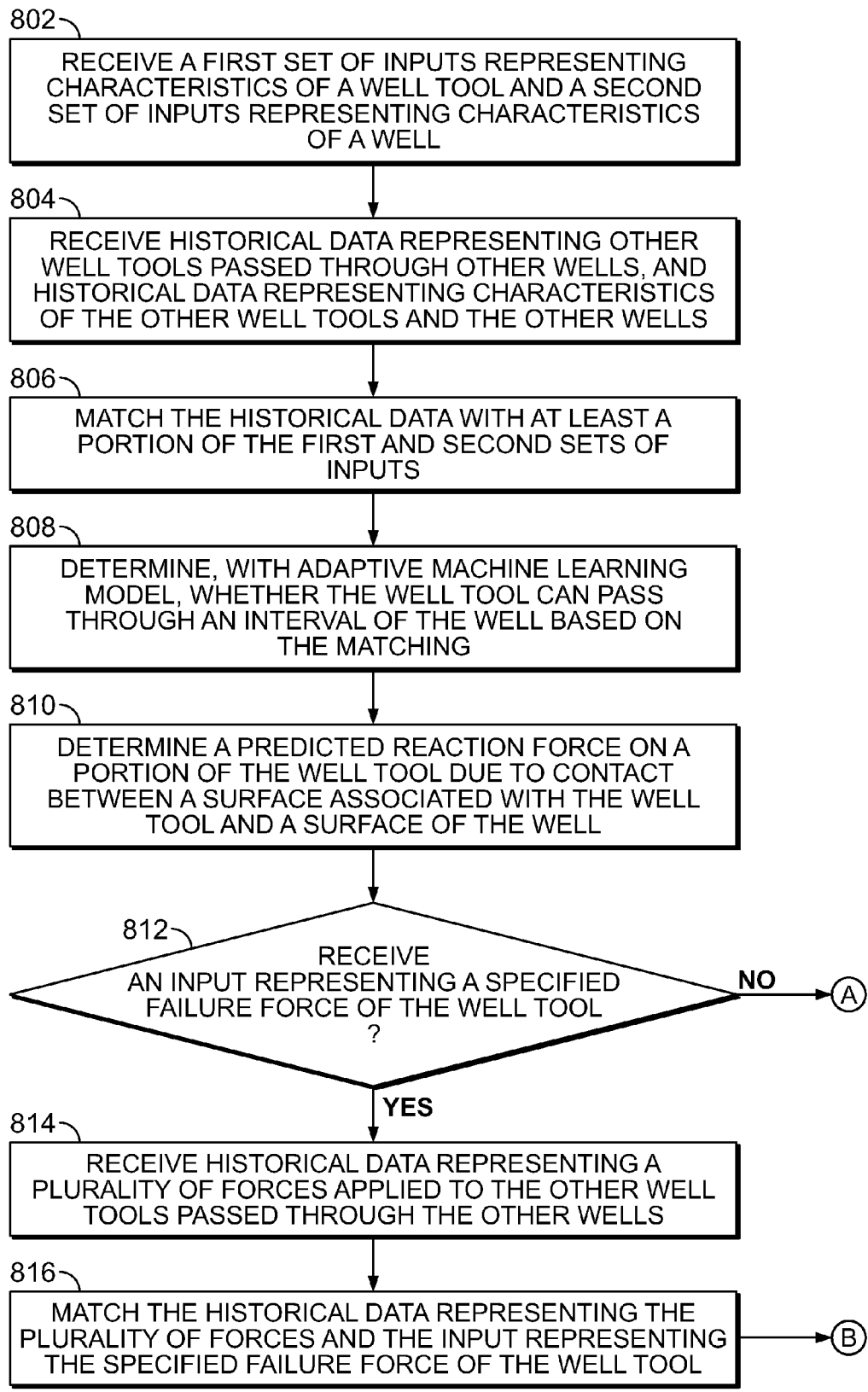
FIGS. 8A-8B illustrate flowcharts describing example methods for modeling passage of a well tool through a portion of a well using an adaptive machine learning model.
Figure 8A:
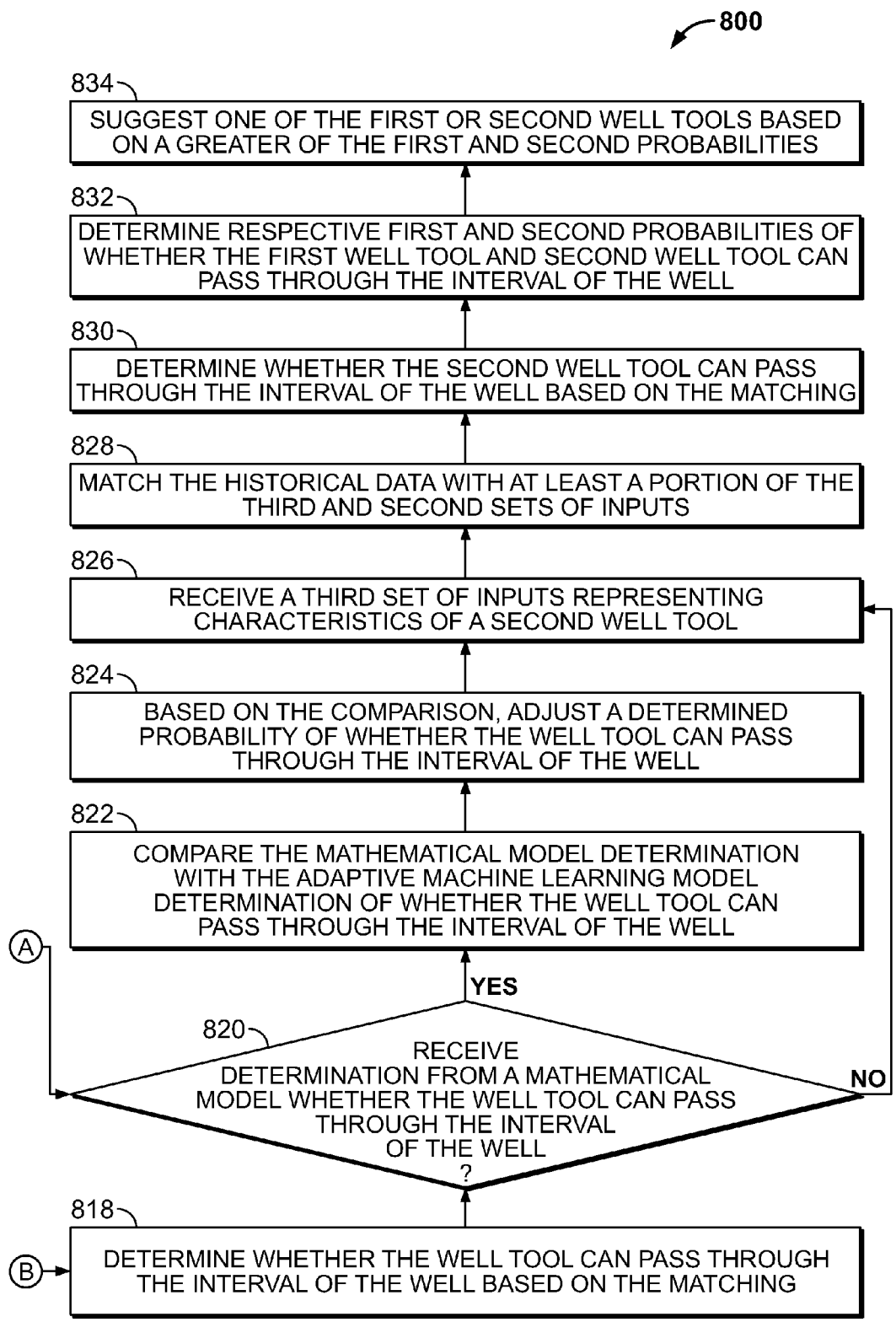

Turning now to FIGS. 6-8, some example methods in operation of the modeling system are described.

Figure 6B:
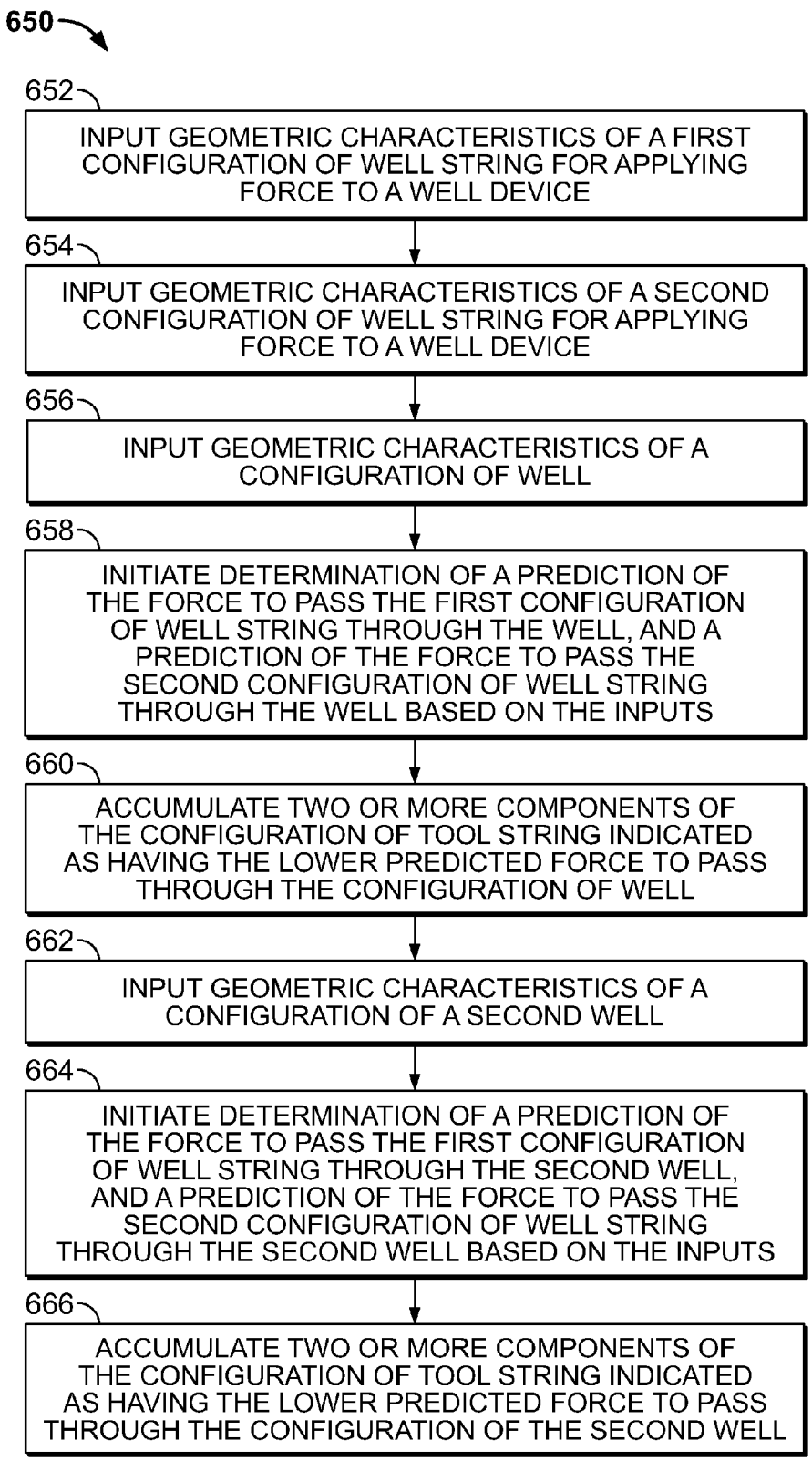

FIGS. 6A-6B illustrate flowcharts describing example methods 600 and 650, respectively, for modeling passage of a well string through a portion of a well. Methods 600 and 650 may, in some embodiments, be implemented by the 3D modeling system 185 illustrated in FIG. 1. Alternatively, methods 600 and 650 may be implemented by the tool passage modeling system 200 illustrated in FIG. 2, which may implement, for example, a mathematical model, a 3D geometric model, and an adaptive machine learning model, as shown in FIG. 2.

Example methods 600 and 650 are shown as having a number of steps that may or may not be performed in the order depicted in the flow chart. In certain instances, some of the steps may be omitted and/or repeated and other steps may be added.

In step 602, inputs are received, for example into a 3D modeling system, representing geometric characteristics of a well string. In some embodiments, the geometric characteristics may include a length of the well string or lengths of particular components of the well string, as well as diameters of the well string and particular components of the well string. In some embodiments, the input may specify a particular well string (e.g., by manufacturer, by type of well string component, or otherwise), and the 3D modeling system may receive specific geometric characteristics from for example, a data store, for the particular well string. The geometric characteristics may include, for example, dimensions such as diameters and otherwise, of outwardly facing lateral faces of the well string.

In step 604, the 3D modeling system receives inputs representing geometric characteristics of a well. For example, the geometric characteristics of the well may include one or more diameter dimensions of the well (or other tubular structure, such as a casing), as well as one or more lengths associated with the well. For example, there may be different diameter portion of the well with each diameter portion having a particular length. In some embodiments, the inputs received in steps 602 and 604 may be received by the 3D modeling system through a graphical user interface, such as the graphical user interface 300 shown in FIG. 3A.

In step 606, the 3D modeling system compares the geometric characteristics of the well string and the geometric characteristics of the well. In some embodiments, comparison of such geometric characteristics may include a comparison of particular contact points for surfaces between the well string in the well. For example, the 3D modeling system may compare a solid 3D model of the well string with a 3D model of the well based on the geometric characteristics of the well string and well. The solid model of the well string may be derived and or calculated based on stored information about the well string for particular components of the well string.

In step 608, the 3D modeling system may determine a prediction of a force to pass the well string through the well based on the comparison in step 606. For example, in comparing the geometric characteristics of the well string and the geometric characteristics of the well, the 3D modeling system may determine that contact between at least one surface of the well string and a surface of the well may occur. Based on the comparison, the 3D modeling system may determine the magnitude of forces required to move the well string through the well and past the contact point of the surfaces.

In step 610, the 3D modeling system may determine whether the well string will pass through the well based on the comparison step 606. For example, in some embodiments, the 3D modeling system may determine whether there is sufficient space within the well to pass the well string through given the geometric characteristics of the well string and the well. Further, the predicted force (or forces) determined in step 608 may also determine, at least in part, whether the well string can pass through the well. For example, if the predicted force (or forces) is greater than a specified failure force of the well string, passage of the well string through the well may not be possible.

In step 612, the 3D modeling system determines a radial position of the well string relative to the well due to loads on the well string. For example, due to fluid forces, wellbore forces, or other loads on the well string, the well string may be shifted radially within the well.

In step 614, the 3D modeling system may generate an image of the well string in the well depicting contacting surfaces of the well string and the well. For example, based on the comparison of the geometric characteristics of the well string and the geometric characteristics of the well in step 608, the 3D modeling system may determine contact points for contact surfaces between the well string in the well. Such contact points and contact surfaces may be depicted graphically in a representative image of the well string in the well. For example, FIGS. 4A-4B show such a representative image of a well string in a well depicting contacting surfaces of the well string in the well.

In step 616, the 3D modeling system determines whether it receives a current location of the well string within the well. If the 3D modeling system receives the current location of the well string in the well in step 616, then in step 618, the 3D modeling system may generate an image of the well string in the well depicting the contacting surfaces of the well string in the well at the current location.

If the 3D modeling system does not receive the current position of the well string in the well at step 616, or after completion of step 618, the method 600 may continue to step 620. In step 620, the 3D modeling system may determine whether it receives geometric characteristics of a tubing string having the well string deployed thereon. For example, in some embodiments, the well string may be deployed on a tubing string, such as a coiled tubing string or straight threaded tubing string.

If the 3D modeling system receives the geometric characteristics of the tubing string in step 620, then in step 622, the 3D modeling system compares the geometric characteristics of the well string, the tubing string characteristics, and the geometric characteristics of the well. In step 624, the 3D modeling system may then determine a force to pass the well string through the well based on the comparison of the well string characteristics, tubing string characteristics, and well data.

If, in step 620, the 3D modeling system does not receive the geometric characteristics of the tubing string, or after completion of step 624, method 600 continues with step 626. In step 626, the 3D modeling system determines whether it receives characteristics of a line supporting the well string in the well. For example, in some embodiments, the well string may be deployed on an electric line, such as a slickline or braided line or other type of wireline.

If the 3D modeling system receives the characteristics of the line in step 626, then in step 628, the 3D modeling system compares the geometric characteristics of the well string, the line characteristics, and the geometric characteristics of the well. In step 630, the 3D modeling system may then determine a force to pass the well string through the well based on the comparison of the well string characteristics, the line characteristics, and the well data.

Turning to FIG. 6B and method 650, this example method may start at step 652 when a user of a 3D modeling system inputs geometric characteristics of a first configuration of a well string for applying force to a well device. For example, in some embodiments, the user may utilize a graphical user interface, such as the graphical user interface 300 shown in FIG. 3A, to input the geometric characteristics of the first configuration of the well string. Such inputs can include, for example, specific geometric dimensions, such as lengths and diameters, of the first configuration of the well string. Alternatively, the user may input component names or other information (e.g., manufacture information or otherwise) into the graphical user interface and the 3D modeling system may receive specific geometric information based on the input (e.g., from the solid model store 225, the tool/well/fluids specification store 230, or other repository).

In step 654, the user inputs geometric characteristics of a second configuration of a well string for applying force to a well device. For example, inputs for the second configuration may be implemented into the 3D modeling system in similar fashion as the input for the first configuration. In some embodiments, the force applied by either of the first configuration of a well string for the second configuration of a well string may actually or otherwise operate the well the box (e.g., a Packer, a plug, or other downhole device).

In step 656, the user inputs geometric characteristics of a configuration of the well. For example, the geometric characteristics may include various diameters of the well (or other tubular), as well as lengths of all or portions of the well. The geometric characteristics may also include specific information about particular irregularities (e.g., crevices, turns, jogs, dog legs, or otherwise) as determined, for example, by a caliper system.

In step 658, the user initiates a determination of a prediction of a force to pass the first configuration of a well string through the well (or at least a particular portion of the well). This initiation may include initiating the 3D modeling system to determine the force through the graphical user interface. Step 658 also includes initiating determination of a prediction of the force to pass the second configuration of a well string through the well based on the inputs of steps 652, 654, and 656.

In step 660, the user may then accumulate two or more components of the particular configuration (i.e., the first configuration or the second configuration) of a tool string indicated as having the lower predicted force to pass the configuration of the well. For example, after the user initiates determination of the prediction of forces to pass the first and second configurations of a well string through the well, the 3D modeling system may determine such forces and provide the determination of such forces to the user (e.g., graphically, textually, or otherwise).

In step 662, the user may then input geometric characteristics of a configuration of a second well. In some embodiments, the second well may have different characteristics, such as different geometric characteristics, as compared to the well defined in 656. For example, the configuration of the second well may have different diameters of wellbore, casing, or other tubulars, as well as, for example, a different vertical depth as compared to the first well. As another example, the configuration of the second well may be a directional well, while the configuration of the first well defined in step 656 may be a substantially vertical well. As another example, the configuration of the second well and the configuration of the first well may both be directional wells, but the second configuration may have a tighter radius between a substantially vertical portion and a substantially horizontal portion of the well as compared to the configuration of the first well.

In step 664, the user initiates a determination of a prediction of the force to pass the first configuration of the well string through the second well. Step 664 also includes an initiation, by the user, of a determination of a prediction of the force to pass the second configuration of the well string through the second well. The determination may be made by the 3D modeling system based on, for example, the inputs provided in step 652, 654, and 662.

In step 666, the user may then accumulate two or more components of the particular configuration of tool string (i.e., the first configuration or the second configuration) indicated as having the lower predicted force to pass through the configuration of the second well.

FIGS. 7A-7B are flowcharts describing the example method 700 and 750, respectively, for modeling operation of a well tool in applying a force to a device in a well. Method 750 may, in some instances, be implemented by the 3-D modeling system 185 illustrated in FIG. 1, by the modeling system 200 illustrated in FIG. 2, and/or another modeling system.

Example methods 700 and 750 are shown as having a number of steps that may or may not be performed in the order depicted in the flow chart. In certain instances, some of the steps may be omitted and/or repeated and other steps may be added.

In method 700, step 702, a computing system receives inputs representing geometric characteristics of a well tool for applying force to a device in a well. The device in a well can be a number of different devices. For example, in the context of a jarring operation where the well tool is a jar, the device might be tool actuated in response to the jarring force, a tool or other item lodged in the well that will be jarred loose, or another device. In certain instances, geometric characteristics of the well tool can be stored in a data store, such as the solid model store 225 and/or tool/well/fluid specification store 230 shown in FIG. 2. In certain instances, the geometric characteristics of the well tool can be manually entered, input from another system, and/or input in another manner. Other characteristics of the well tool can also be received by the computing system.

In step 704, the computing system also receives inputs representing geometric characteristics of the well. As above, in certain instances, the geometric characteristics of a well can be stored in a data store, such as the solid model store 225 and/or tool/well/fluid specification store 230 shown in FIG. 2. In certain instances, the geometric characteristics of the well can be manually entered, input from another system and/or input in another manner. Other characteristics of the well can also be received by the computing system.

In step 706, the computing system compares the geometric characteristics of the well tool and the geometric characteristics of the well, and in step 708, determines a predicted reaction force on the well tool due to contact of a surface associated with the well tool and a surface of the well. The reaction force is of a nature that affects operation of the well tool. In the context of a jarring tool, the reaction force may counter the impact force produced by the jar. In certain instances, the reaction force is a frictional force acting between the well and the surface associated with the well tool. In certain instances, the surface associated with the well tool is on the well tool itself, in other instances surface can be a surface of another component that is coupled to the well tool, such as other components of the tool string, the line supporting the tool string, and/or other.

In step 710, the computing system can determine a predicted net force that can be applied by the well tool to the device. In certain instances, the net force is a function of the total amount of force that the well tool can apply to the device less the predicted reaction force. The determination of the net force can take other characteristics into account, including contributions of force provided by other components coupled to the well tool.

In step 712, the computing system receives inputs representing geometric characteristics of a second well tool for applying force to the device. In certain instances, the second well tool is another well tool in the tool string. In the context of a jarring tool, the second tool may be another jarring tool, accelerator, a stem and/or another tool. As above, in certain instances, the geometric characteristics of the second well tool can be stored in a data store, such as solid model store 225 and/or the tool/well/fluid specification store to 30 shown in FIG. 2. In certain instances, the geometric characteristics of a well can be manually entered, input from another system and/or input in another manner. Other characteristics of the second well tool can also be received by the computing system.

In step 714, the computing system compares the geometric characteristics of the second well tool and the geometric characteristics of the well, and in step 716, determines a predicted reaction force on the well tool due to contact of a surface associated with the second well tool and a surface of the well. The reaction force is of a nature that affects operation of the well tool. In the context of a jarring tool, the reaction force may counter the impact force produced by the jar. In certain instances, the reaction force is a frictional force acting between the well and the surface associated with the well tool. In certain instances, the surface associated with the second well tool is on the second well tool itself, and in other instances, the surface can be a surface of another component that is coupled to the second well tool, such as other components of the tool string, the line supporting the tool string, and/or other.

In step 718, the computing system can determine a predicted total net force that can be applied by the first and second well tools to the device. In certain instances, the net force is a function of the total amount of force that the well tools can apply to device less the predicted reaction forces. The determination of the net force can take other characteristics into account, including contributions of force provided by other components coupled to the well tool.

In step 720, inputs representing geometric characteristics of a tool string are received by the computing system. Then in step 722 the computing system can additionally or alternatively compare the geometric characteristics of the well screen and the geometric characteristics of the well. In step 724, the computing system can determine a predicted reaction force due to contact of the well string with the well. As above, the predicted reaction force determined in step 724 is of a nature that effects operation of the well tool.

In this manner, the operation of a well tool is modeled in applying a force to a device in a well.

In method 750, step 752, geometric characteristics of the first configuration of well string for applying force to a well device in a well are input into a computing system. As above, the device can be a number of different devices. Also as above, the geometric characteristics of the well tool can be stored in a data store, such as the solid model store 225 and/or the tool/well/fluid specification store 230 shown in FIG. 2. The user can access these data stores via a GUI. In certain instances, the geometric characteristics of the well tool can be manually entered, input from another system, and/or input in another manner. Other characteristics of the well tool can also be input into the computing system.

In step 754, geometric characteristics of a second configuration of well string for applying force to the well device are input into the computing system. As above, the geometric characteristics can be input from a data store, manually entered, input from another system, and/or input another manner. Other characteristics of the second configuration well tool can also be input into the computing system. In step 756, geometric characteristics of the configuration of well that contains the device are input into the computing system. As above, the geometric characteristics can be input from a data store, manually entered, input from another system, and/or input and another manner. Other characteristics of the well can also be input into the computing system.

In step 758, the computing system is initiated to determine a prediction of the force that the first configuration of the well string is capable of applying to the device, and a prediction of the force that the second configuration of well string is capable of applying to the device. Based on this information, components of the configuration of well string indicated by the computing system as capable of applying the higher predicted force are accumulated, for example, to build such configuration of the well string and/or to ship the components of such configuration of well string to customer.

Figure 8B:
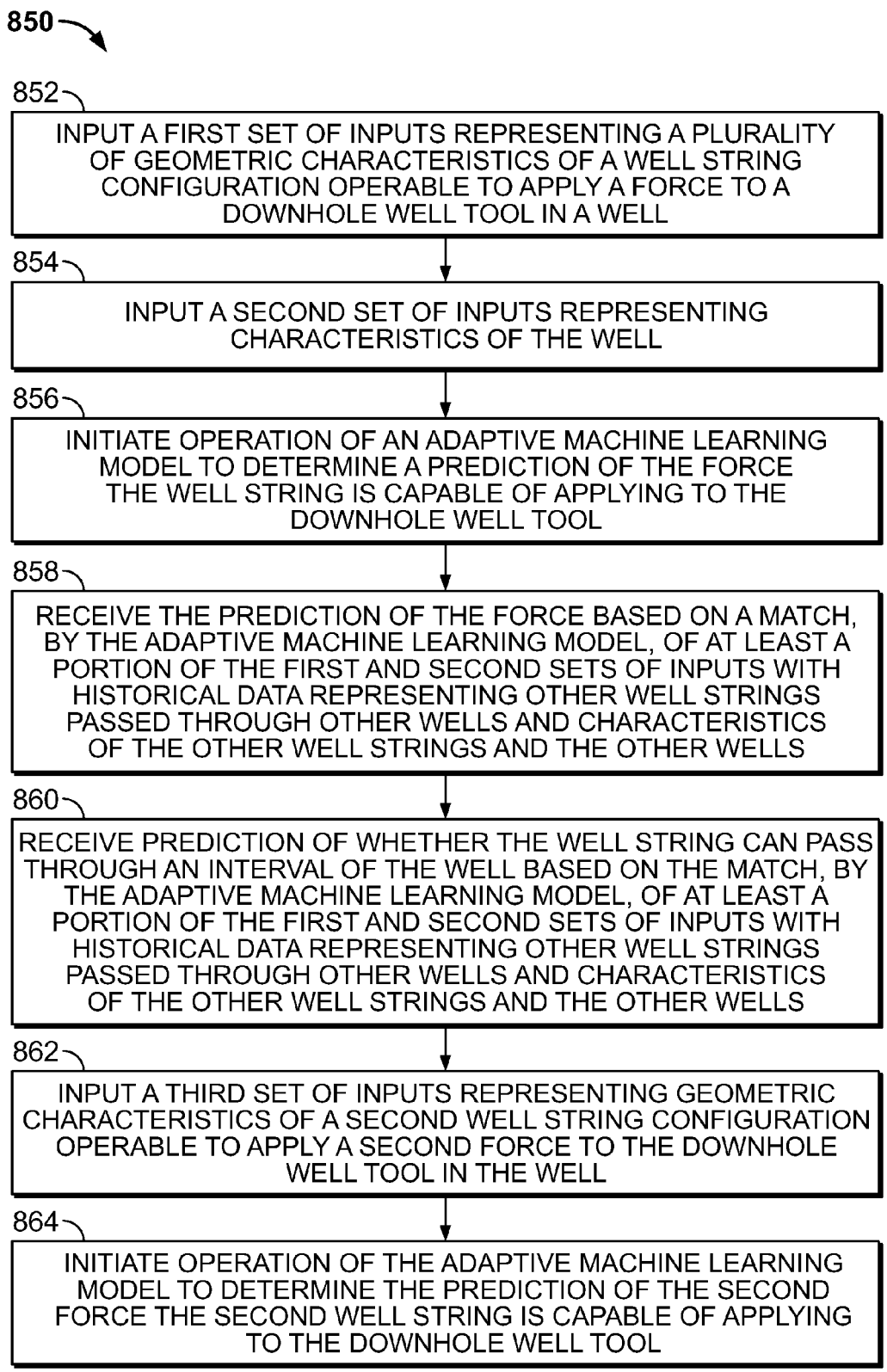

FIGS. 8A-8B illustrate flowcharts describing example methods 800 and 850, respectively, for modeling passage of a well tool through a portion of a well using an adaptive machine learning model. Methods 800 and 850 may, in some embodiments, be implemented by the 3D modeling system 185 illustrated in FIG. 1. Alternatively, methods 800 and 850 may be implemented by the tool passage modeling system 200 illustrated in FIG. 2, which may implement, for example, an adaptive machine learning model, such as the adaptive machine learning model 210 illustrated in FIG. 2.

Example methods 800 and 850 are shown as having a number of steps that may or may not be performed in the order depicted in the flow chart. In certain instances, some of the steps may be omitted and/or repeated and other steps may be added.

In step 802, the adaptive machine learning model receives a first set of inputs representing characteristics of a well tool. The adaptive machine learning model also receives a second set of inputs representing characteristics of a well. In some embodiments, the adaptive machine learning model may be a neural network executed on a computing system, such as the computing system 150 shown in FIG. 1.

In step 804, the adaptive machine learning model receives historical data representing a plurality of other well tools passed through a plurality of other wells. For example, in some embodiments, the historical data may be stored in a history store, such as the history store to 235 shown in FIG. 2. Alternatively, the historical data be stored in any appropriate database or repository communicably coupled to the adaptive machine learning model. For example, the historical data may be stored as the data 195 in the repository 190 shown in FIG. 1. Step 804 also includes receiving historical data representing a plurality of characteristics of the other well tools and the other wells.

In step 806, the adaptive machine learning model matches the historical data with at least a portion of the first and second sets of inputs. For example, characteristics of the well tool, such as geometric characteristics of an outer surface of the well tool (e.g., lateral outer surfaces of the well tool) may be compared to historical data representing geometric characteristics of the other well tool passed the other well. In addition, the characteristics of the well maybe next historical data representing characteristics of the other well. Such characteristics may include, for example, information regarding wellbore diameter, wellbore shoulders, wellbore cavities, and other geometric characteristics of the well and the other wells.

In step 808, the adaptive machine learning model determines whether the well tool may pass through the interval of the well based on the matching of the first and second sets of inputs and the historical data. For example, in some embodiments, the adaptive machine learning model performs historical matching to determine whether the well tool can pass through the interval of the well based on, for example, previous similar well tools that passed through other wells of similar or identical characteristics as the well defined in step 802. More specifically, the adaptive machine learning model may look for similar of the other wells with similar characteristics of the well defined in step 802, and may also look for similar other well tools with similar characteristics (e.g., geometric or shape characteristics) of the well tool defined in step 802. Based on a determination that the other similar well tools have passed through the other similar wells, the adaptive machine learning model may determine that the well tool passes through the interval the well.

In step 810, the adaptive machine learning model may determine a predicted reaction force on a portion of the well tool due to contact between a surface associated with the well tool and a surface of the well. For example, based on the matching of historical data with the portion of the first and second sets of inputs, the adaptive machine learning model may predict contact between a surface associated with the well tool, such as a lateral facing surface, and the surface of the well, such as the wellbore (or other tubular surface). In determining such contact, the adaptive machine learning model may predict, based on the historical matching, the reaction force on the portion of the well tool. In some embodiments, the predicted reaction force may be equal to or substantially similar to the force necessary to urge the well tool through the interval of the well to overcome such contact between the surface associated with the well tool and the surface of the well.

In step 812, the adaptive machine learning model determines whether an input representing the specified failure force of the well tool is received. If the adaptive machine learning model determines that such an input is received, in step 814, the adaptive machine learning model receives historical data representing a plurality of forces applied to the other well tools passed through the other wells. For example, the historical data may include force data measured by, for example, sensors on the other well tools during passage of the other well tools through the other wells. Such historical force data may be stored and indexed by, for example, a particular location within the other wells in which the forces were measured on the other well tools.

In step 816, the adaptive machine learning model matches the historical data representing the plurality of forces and the input representing the specified failure force of the well tool. In some embodiments, such matching may be a simple matching comparing force magnitude of the plurality of forces stored in the historical data to a force magnitude of the specified failure force of the well tool. Alternatively, the matching may include a comparison of both force magnitude and force vectors of the plurality of forces stored in the historical data with the force magnitude and a force vector of the specified failure force of the well tool. Force vectors may include, for example, vectors indicating an axial force (e.g., uphole or downhole) or a radial force acting on the well tools.

In step 818, the adaptive machine learning model determines whether the well tool can pass through the interval of the well based on the matching of the historical data representing the plurality of forces and the input representing the specified failure force of the well tool. For example, if the matching of the historical data and the input representing the specified failure force indicates that the specified failure force is much less in magnitude as compared to the historically collected force data, then the adaptive machine learning model may determine that the well tool cannot pass through the interval of the well. For instance, the adaptive machine learning model may determine that damage (e.g., catastrophic) to the well tool may occur based on the predicted forces that will be applied to the well tool in the well that are greater than the specified failure force of the well tool. Alternatively, if the specified failure force of the well tool is much greater in magnitude than the historical data representing the plurality of forces, then the adaptive machine learning model may determine that the well tool can pass through the interval of the well.

If the adaptive machine learning model does not receive an input representing the specified failure force of the well tool in step 812, or once the adaptive machine learning model determines whether the well tool can pass through the interval of the well in step 818, method 800 continues to step 820. In step 820, the adaptive machine learning model determines whether it has received, from a mathematical model, a determination whether the well tool can pass through the interval of the well. For example, a mathematical model, such as the mathematical model 220 shown in FIG. 2, may also make a determination separate from the adaptive machine learning model as to whether the well tool can pass through the interval the well.

If the adaptive machine learning model receives a determination from the mathematical model whether the well tool can pass through the interval of the well, then the adaptive machine learning model compares the mathematical model determination with its own determination of whether the well tool can pass through the interval of the well in step 822. In step 824, the adaptive machine learning model, based on the comparison, adjusts a probability (e.g. a previously determined probability or a new probability) of whether the well tool can pass through the interval of the well. For example, if the determination made by the mathematical model agrees with the determination made by the adaptive machine learning model, then a determined probability of whether the well tool can pass through the interval of the well may be adjusted higher. If, however, determination made by the mathematical model does not agree with the determination made by the adaptive e-learning model, then the determine probability of whether the well tool can pass through interval of the well may be adjusted lower.

In some embodiments, the mathematical model, such as the mathematical model 220, as well as a 3D geometric model, such as the 3D geometric model 215 shown in FIG. 2, may make determinations (e.g., independent or in conjunction) of whether the well tool can pass through the interval of the well. In some cases, such determination may conflict. For example, the mathematical model determination may indicate that the well tool can pass through the interval of the well, while the 3D geometric model determination may indicate that the well tool cannot pass through the well. In such cases, the determination by the adaptive machine learning model may act as a tiebreaker to make a final determination of whether the well tool can pass through the interval of the well, adjust a probability of whether the well tool can pass through the well, determine one or more reaction forces on the well tool as it passes (or attempts to pass) through the interval of the well, or otherwise. For example, a comparison may be made of the mathematical model determination of whether the well tool can pass through the interval of the well with the 3D geometric model determination of whether the well tool can pass through the interval of the well. Based on the comparison and on the adaptive machine learning model determination of whether the well tool can pass through the interval of the well, a determined probability of whether the well tool can pass through the interval of the well may be adjusted (e.g. higher or lower). For instance, if both the 3D geometric model and adaptive machine learning model determine that the well tool cannot pass through the interval of the well, then the probability may be adjusted downward.

Continuing after step 824, or after a "no" determination in step 820, in step 826, the adaptive machine learning model receives a third set of inputs representing characteristics of a second well tool. For example, the third set of inputs may represent geometric characteristics of the second well tool, such as, for example, geometric characteristics of one or more outer, laterally facing surfaces of the second well tool.

In step 828, the adaptive machine learning model matches the historical data representing the other well tools passed through the other wells with at least a portion of the third and second sets of inputs. In some embodiments, step 828 may be substantially similar to step 806, but the adaptive machine learning model compares characteristics of the second well tool and the well as opposed to the first well tool and the well.

In step 830, the adaptive machine learning model determines whether the second well tool can pass through the interval of the well based on the matching of the historical data with at least a portion of the third and second sets of inputs. Much like step 808, in step 830, the adaptive machine learning model uses the comparative historical matching of the data representing previous well tools passed through previous wells with characteristics of the second well tool defined in step 826 and the characteristics of the well defined in step 802.

In step 832, the adaptive machine learning model may determine respective first and second probabilities of whether the first well tool and second well tool can pass through the interval of the well. For example, the first probability of whether the first well tool can pass through the interval of the well may be based on historical data indicating successes or failures of similarly-sized and shaped well tools (as compared to the first well tool) that have been deployed in similar wells (as compared to the well defined in step 802). Likewise, the second probability of whether the second well tool can pass through the interval of the well may be based on historical data indicating successes or failures of similarly-sized and shaped well tools (as compared to the second well tool) that have been deployed in similar wells (as compared to the well defined in step 802). In many cases, the first and second well tool are different in that, even though they may perform a similar or identical downhole function or operation (e.g., actuating a downhole well tool or device), they may have different geometric characteristics (e.g., different lengths, different diameters, different shapes, and otherwise). Accordingly, a determination of the first and second probabilities may provide a well operator insight into which of the first or second well tools can more successfully pass through the interval of the well to accomplish the desired function or operation.

In step 834, the adaptive machine learning model may suggest one of the first or second well tools based on a greater of the first and second probabilities. For example, should the first well tool have a greater probability of success in passing through the interval of the well tool, the adaptive machine learning model may suggest this tool to a well operator to accomplish the desired function or operation. In some embodiments, if the first and second probabilities are similar, or identical, the adaptive machine learning model may present both options of the first and second well tool to the well operator along with their respective probabilities. The well operator can then make a selection of the first or second well tool based on an evaluation of the tools and their respective probabilities.

Turning now to method 850 shown in FIG. 8B, method 850 may begin at step 852 when the user of an adaptive machine learning model executed on a computing system inputs a first set of inputs representing a plurality of geometric characteristics of a well string configuration operable to apply force to a downhole well tool and a well. For example, the user may input the first set of inputs into a graphical user interface (GUI), such as the graphical user interface 300 shown in FIG. 3A. In some embodiments, geometric characteristics may simply include a length of the well string and an average, or largest, outer diameter of the well string. Alternatively, the user may specify particular components (e.g., by component name, manufacturer, or otherwise) and the adaptive machine learning model may receive geometric data describing each component from a data store (such as the data stores 225 and/or 230). In some embodiments, the geometric characteristics may specify one or more diameters of each component of the well string. The geometric characteristics may also include a specific length of each component of the well string.

In step 854, the user may input a second set of inputs representing characteristics of the well. For example, the well characteristics may include geometric characteristics of the well, such as one or more diameters of the well (or other tubular in the well) as well as geometric characteristics of a wellbore wall of the well, such as shoulders, crevices, or other hang-up points along a surface of the well (e.g., as determined by MWD, LWD or caliper data). Additional characteristics of the well may include lengths of one or more intervals of the well, such as lengths of intervals with varying diameters.

In step 856, the user initiates operation of the adaptive machine learning model to determine a prediction of the force that the well string is capable of applying to the downhole well tool. In some embodiments, initiating operation of the adaptive machine learning model may include initiating operation through a graphical user interface portion of the adaptive machine learning model, such as the interface 300 shown in FIG. 3A.

In step 858, the user receives the prediction of the force. The prediction of the force may be based on a match, by the adaptive machine learning model, of at least a portion of the first and second sets of inputs with historical data representing other well strings passed through other wells, as well as characteristics of the other well strings and the other wells. For example, the historical data may include geometric and force data gathered during operations of the other well strings that are similar (e.g., geometrically, shape, components, and otherwise) to the well string.

In step 860, the user may receive a prediction of whether the well string can pass through the interval of the well based on the match by the adaptive machine learning model of at least a portion of the first and second sets of inputs with historical data representing other well string characteristics of the other well strings and the other wells.

In step 862, the user inputs a third set of inputs representing geometric characteristics of a second well string configuration operable to apply a second force to the downhole well tool in the well. For example, much like step 852, the user can input additional inputs representing characteristics of the second well string in order to, for example, compare the first well string configuration with the second well string configuration. Such comparison may be useful in determining which well string configuration can best accomplish the desired function or operation (e.g., applying a force to the downhole well tool to, for example, actuate the downhole well tool), while being able to pass through the interval of the well.

In step 864, the user initiates operation of the adaptive machine learning model to determine a prediction of the second force that the second well string is capable of applying to the downhole well tool. Thereafter, the user may receive the prediction of the second force based on a match by the adaptive machine learning model of a least a portion of the third and second sets of inputs the historical data representing the other well strings passed through the other wells, as well as the characteristics of the other well strings and the other wells.

A number of embodiments have been described. Nevertheless, it will be understood that various modifications may be made. Accordingly, other embodiments are within the scope of the following claims.

What is claimed is:

1. A computer-implemented method for modeling passage of an elongate well tool through a well, the method comprising:
receiving, with a computing system, inputs representing a plurality of geometric characteristics of the well tool including three dimensional surface data characterizing the shape of outwardly facing, lateral surfaces of the well tool;
receiving, with the computing system, inputs representing a plurality of geometric characteristics of the well;
determining, with the computing system, a radial position of the well tool within the well and relative to a radial surface of the well due to loads on the well tool; and
determining, with the computing system, a prediction of the force to pass the well tool through at least a portion of the well based on a comparison of the three dimensional surface data of the well tool, the radial position of the well tool relative to the well, and the plurality of geometric characteristics of the well.

2. The computer-implemented method of claim 1, further comprising determining, with the computing system, whether the well tool will pass through the at least a portion of the well based on the comparison of the three dimensional surface data of the well tool and the plurality of geometric characteristics of the well.

3. The computer-implemented method of claim 1, wherein determining, with the computing system, the radial position of the well tool comprises determining radial deflection of the well tool.

4. The computer-implemented method of claim 1, wherein the loads comprise fluid imposed loads, thermal imposed loads, gravitationally imposed loads, and loads imposed due to interaction between the well tool and the well as the well tool moves axially through the well.

5. The computer-implemented method of claim 1, wherein the plurality of geometric characteristics of the well include three dimensional surface data characterizing one or more inwardly facing, lateral surfaces of the well that will pass directly adjacent one or more outwardly facing, lateral surfaces of the well tool as the well tool attempts to pass through the at least a portion of the well.

6. The computer-implemented method of claim 1, further comprising generating, with the computing system, an image of the well tool and the well depicting contacting surfaces of the well tool and the well.

7. The computer-implemented method of claim 1, further comprising receiving, with the computing system, inputs representing a current location of the well tool in the well; and
where generating, with the computing system, an image of the well tool and the well depicting contacting surfaces of the well tool and the well comprises generating a current image based on the current location.

8. The computer-implemented method of claim 1, where determining, with the computing system, a prediction of the force to pass the well tool through at least a portion of the well comprises determining, with the computing system, a prediction of the force to pass the well tool from a location proximate the surface to a specified location in the well.

9. The computer-implemented method of claim 1, further comprising receiving, with the computing system, inputs representing a plurality of geometric characteristics of a tubing string having the well tool, the inputs including three dimensional surface data characterizing the shape of outwardly facing, lateral surfaces of the well tool; and
where determining, with the computing system, a prediction of the force to pass the well tool through at least a portion of the well comprises determining, with the computing system, a prediction of the force to pass the well tool through at least a portion of the well based on a comparison of the three dimensional surface data of the well tool and three dimensional surface data of the tubing string with the plurality of geometric characteristics of the well.

10. The computer-implemented method of claim 1, further comprising receiving, with the computing system, inputs representing characteristics of a line supporting the well tool in the well; and
where determining, with the computing system, a prediction of the force to pass the well tool through at least a portion of the well comprises determining, with the computing system, a prediction of the force to pass the well tool through at least a portion of the well based on a comparison of the three dimensional surface data of the well tool and characteristics of the line supporting the well tool in the well with the plurality of geometric characteristics of the well.

11. An apparatus comprising instructions embodied on a tangible, non-transitory computer-readable media, the instructions operable when executed to cause a computing system to perform operations comprising:
receiving, with the computing system, inputs representing a plurality of geometric characteristics of a well tool including three dimensional surface data characterizing the shape of outwardly facing, lateral surfaces of the well tool;

receiving, with the computing system, inputs representing a plurality of geometric characteristics of a well;

determining, with the computing system, a radial position of the well tool within the well and relative to a radial surface of the well due to loads on the well tool; and determining, with the computing system, a prediction of the force to pass the well tool through at least a portion of the well based on a comparison of the three dimensional surface data of the well tool, the radial position of the well tool relative to the well, and the plurality of geometric characteristics of the well.

12. The apparatus of claim 11, where the plurality of geometric characteristics of the well include three dimensional surface data characterizing the inwardly facing, lateral surfaces of the well that will pass directly adjacent the outwardly facing, lateral surfaces of the well tool as the well tool attempts to pass through the at least a portion of the well.

13. The apparatus of claim 11, where the operations further comprise generating, with the computing system, an image of the well tool and the well depicting contacting surfaces of the well tool and the well.

14. The apparatus of claim 11, where the operations further comprise determining, with the computing system, whether the well tool will pass through the at least a portion of the well based on the comparison of the three dimensional surface data of the well tool and the plurality of geometric characteristics of the well.

15. A computing system for modeling passage of an elongate well tool through a well, comprising a memory, a processor, and instructions stored in the memory and executable by the processor to perform operations comprising:

receiving, with the computing system, inputs representing a plurality of geometric characteristics of the well tool including three dimensional surface data characterizing the shape of outwardly facing, lateral surfaces of the well tool;

receiving, with the computing system, inputs representing a plurality of geometric characteristics of the well;

determining, with the computing system, a radial position of the well tool within the well and relative to a radial surface of the well due to loads on the well tool; and determining, with the computing system, a prediction of the force to pass the well tool through at least a portion of the well based on a comparison of the three dimensional surface data of the well tool, the radial position of the well tool relative to the well, and the plurality of geometric characteristics of the well.

16. The computing system of claim 15, where the operations further comprise generating, with the computing system, an image of the well tool and the well depicting contacting surfaces of the well tool and the well.

17. The computing system of claim 15, where the plurality of geometric characteristics of the well include three dimensional surface data characterizing one or more inwardly facing, lateral surfaces of the well that will pass directly adjacent one or more outwardly facing, lateral surfaces of the well tool as the well tool attempts to pass through the at least a portion of the well.

18. The computing system of claim 15, where the operations further comprise determining, with the computing system, whether the well tool will pass through the at least a portion of the well based on the comparison of the three dimensional surface data of the well tool and the plurality of geometric characteristics of the well.

19. The computing system of claim 15, where the operations further comprise receiving, with the computing system, inputs representing characteristics of a line supporting the well tool in the well; and where determining, with the computing system, a prediction of the force to pass the well tool through at least a portion of the well comprises determining, with the computing system, a prediction of the force to pass the well tool through at least a portion of the well based on a comparison of the three dimensional surface data of the well tool and characteristics of the line supporting the well tool in the well with the plurality of geometric characteristics of the well.

* * * * *